US010310686B2

(12) United States Patent
Nekimken et al.

(10) Patent No.: US 10,310,686 B2
(45) Date of Patent: Jun. 4, 2019

(54) RIGID TRACKPAD FOR AN ELECTRONIC DEVICE

(71) Applicant: Apple Inc., Cupertino, CA (US)

(72) Inventors: Kyle J. Nekimken, San Jose, CA (US); Scott J. McEuen, Morgan Hill, CA (US); Forrest W. Liau, Palo Alto, CA (US); Joonas I. Ponkala, San Jose, CA (US); Sanjay C. Sheth, Saratoga, CA (US); Alex J. Lehmann, Sunnyvale, CA (US); Nathan N. Ng, Fremont, CA (US); Matthew B. Frazer, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 79 days.

(21) Appl. No.: 15/411,733

(22) Filed: Jan. 20, 2017

(65) Prior Publication Data

US 2018/0011565 A1    Jan. 11, 2018

Related U.S. Application Data

(60) Provisional application No. 62/360,504, filed on Jul. 11, 2016, provisional application No. 62/413,093, filed on Oct. 26, 2016.

(51) Int. Cl.
*G06F 3/044* (2006.01)
*B32B 37/00* (2006.01)
(Continued)

(52) U.S. Cl.
CPC ............ *G06F 3/044* (2013.01); *B32B 37/003* (2013.01); *B32B 37/10* (2013.01);
(Continued)

(58) Field of Classification Search
CPC .................... G06F 3/044; G06F 1/169; G06F 2203/04103; G06F 2203/04105;
(Continued)

(56) References Cited

U.S. PATENT DOCUMENTS 6,538,211 B2    3/2003  St. Lawrence et al.
6,998,704 B2    2/2006  Yamazaki et al.
(Continued)

*Primary Examiner* — Andrew Sasinowski
(74) *Attorney, Agent, or Firm* — Dorsey & Whitney LLP

(57) ABSTRACT

A laminated stack, such as a trackpad, is assembled by coupling components using an adhesive system. Assembly of the laminated stack includes forming an adhesive-spacing component on a first substrate, forming an adhesive-alignment-holding component on the first substrate in a perimeter around the adhesive-spacing component, forming a bonding component by filling an area within the perimeter with liquid adhesive, and bonding the first substrate to a second substrate by curing the bonding component. The first substrate and the second substrate may each be one of a touch-sensing component and a cover component. The adhesive-spacing component maintains a space between the first substrate and the second substrate while the bonding component cures. The adhesive-alignment-holding component maintains alignment of the first substrate and the second substrate while the bonding component cures.

9 Claims, 34 Drawing Sheets

(51) Int. Cl.
*G06F 1/16* (2006.01)
*B32B 37/10* (2006.01)
*B32B 37/12* (2006.01)

(52) U.S. Cl.
CPC .......... *B32B 37/1284* (2013.01); *G06F 1/169* (2013.01); *B32B 2037/1253* (2013.01); *B32B 2457/00* (2013.01); *G06F 2203/04103* (2013.01); *G06F 2203/04105* (2013.01)

(58) Field of Classification Search
CPC ... B32B 37/10; B32B 37/003; B32B 37/1284; B32B 2457/00; B32B 2037/1253
See application file for complete search history.

(56) References Cited

U.S. PATENT DOCUMENTS

| | | | |
|---|---|---|---|
| 8,373,664 | B2 | 2/2013 | Wright |
| 8,552,299 | B2 | 10/2013 | Rogers et al. |
| 8,808,483 | B2 * | 8/2014 | Sung ................ B32B 17/10036 156/214 |
| 8,823,653 | B2 * | 9/2014 | Matsuo .................. G06F 3/044 345/173 |
| 8,994,668 | B2 * | 3/2015 | Yoshiyama ............. G06F 3/041 345/173 |
| 9,266,310 | B2 * | 2/2016 | Krogdahl ............... B32B 37/003 |
| 9,409,383 | B2 | 8/2016 | Feinstein et al. |
| 2011/0005662 | A1 | 1/2011 | Sung |
| 2013/0127480 | A1 | 5/2013 | Cuseo et al. |
| 2014/0272201 | A1 | 9/2014 | Takeda et al. |
| 2015/0199062 | A1 | 7/2015 | Lang |

* cited by examiner

RIGID TRACKPAD FOR AN ELECTRONIC DEVICE

CROSS-REFERENCE TO RELATED APPLICATIONS

This application claims the benefit under 35 U.S.C. § 119(e) of U.S. Provisional Patent Application No. 62/360,504, filed on Jul. 11, 2016, and entitled "Rigid Trackpad for an Electronic Device," and U.S. Provisional Patent Application No. 62/413,093, filed on Oct. 26, 2016, and entitled "Computing Structures with Enhanced Laminate Stacks, the contents of both of which are incorporated by reference as if fully disclosed mounting.

FIELD

The described embodiments relate generally to a laminated structure for an electronic device. More particularly, the present embodiments relate to a flat and stiff laminated stack with minimal thickness and structural mounting.

BACKGROUND

Many electronic devices include a variety of different lamination stacks. Such lamination stacks may be used to form input devices, including trackpads, touch pads, touch screens, or other touch devices. It may be difficult to produce a lamination stack having a desired rigidity (e.g., flat and stiff with minimal thickness) and quality. The systems and techniques described herein may be used to produce lamination stack, such as for a trackpad or other touch device, having the necessary rigidity.

SUMMARY

The present disclosure relates to a stack of layer components laminated together, such as a trackpad stack. A first layer component or substrate is coupled to a second layer component or substrate by an adhesive system including a bonding component, an adhesive-spacing component, and an adhesive-alignment-holding component. The bonding component bonds layer components. The adhesive-spacing component maintains spacing between the layer components during curing of the bonding component. The adhesive-alignment-holding component maintains alignment of the layer components during curing of the bonding component and defines an area around the adhesive-spacing component that is filled with the bonding component.

In various embodiments, a computing structure for an electronic device includes a cover; a touch-sensing component positioned below the cover; and an adhesive layer coupling the cover to the touch-sensing component. The adhesive layer includes an alignment-holding component defining a perimeter; a spacing component positioned within the perimeter and formed from a cured liquid adhesive; and a bonding component filling a space within the perimeter around the spacing component, the bonding component bonding the cover to the touch-sensing component. The bonding component is formed from the liquid adhesive. The cured liquid adhesive has a higher stiffness than the alignment-holding component. The cured liquid adhesive is dielectrically matched to the spacing component.

In some examples, the computing structure further includes an additional adhesive layer bonded to the touch-sensing component and a stiffener coupled to the touch-sensing component by the additional adhesive layer. In some cases of such examples, the cover and the stiffener are coupled to opposing surfaces of the touch-sensing component.

In various examples, the cured liquid adhesive and the spacing component are optically matched. In numerous examples, the spacing component is one of an array of spacing components. In some cases of such examples, the bonding component surrounds the array of spacing components.

In some embodiments, a method of laminating components of a trackpad includes forming an adhesive-spacing component on a first substrate; forming a perimeter around the adhesive-spacing component from an adhesive-alignment holding component affixed to the first substrate; filling an area within the perimeter with adhesive, thereby forming a bonding component; and curing the bonding component to bond the first substrate to the second substrate. The first substrate is one of a touch-sensing component or a cover component.

In various examples, the operation of filling an area within the perimeter with adhesive includes filling the area within the perimeter with one of a film adhesive, liquid adhesive, or thermal bonding film.

In some examples, the operation of forming a perimeter around the adhesive-spacing component from an adhesive-alignment holding component includes forming the perimeter from an adhesive-alignment holding component that is dielectrically matched to the adhesive-spacing component. In various examples, forming the adhesive-spacing component on the first substrate may include screen printing additional liquid adhesive onto the first substrate to form an array of adhesive-spacing components and curing the additional liquid adhesive. In numerous examples, forming the adhesive-alignment-holding component on the first substrate may include forming a gap and, while curing the bonding component, allowing air to escape the perimeter through the gap or laminating a pressure sensitive adhesive to the first substrate. In various examples, forming the adhesive-spacing component on the first substrate includes at least one of forming columns of cured adhesive on the first substrate, disposing beads of cured adhesive on the first substrate, or laminating a pressure sensitive adhesive to the first substrate. In some examples, the method further includes forming a structure between the first and second substrates that captures excess liquid adhesive; utilizing the structure to prevent the excess liquid adhesive from contacting at least one of a fixture or a component of the trackpad; and removing the structure.

In various examples, forming the adhesive-spacing component on the first substrate includes disposing a mesh on the first substrate that defines apertures that are filled by an array of bonding components. In numerous examples, forming the bonding component includes applying the liquid adhesive to the second substrate; activating the liquid adhesive at room temperature; and bringing the second substrate and the first substrate proximate such that the liquid adhesive fills the area between the adhesive-spacing component and the adhesive-alignment-holding component. In some examples, at least one of the adhesive-spacing component maintains a space between the first substrate and the second substrate while the bonding component cures; the adhesive-alignment-holding component maintains alignment of the first substrate and the second substrate while the bonding component cures; or the bonding component is cured at room temperature.

In numerous embodiments an electronic device includes a touch device stack positioned within an opening of a housing; a flexure plate positioned below and supporting the touch device stack, the flexure plate underlying at least some sides of the touch device stack but not a center of the touch device stack; an anchor affixing the flexure plate to the housing; and a support positioned between a surface of the flexure plate and the touch device stack and formed from a compliant material. The flexure plate is operable to deform in response to a force applied to the touch device stack.

In some examples, the touch device stack has a width measured along a first edge and a length measured along a second edge, the length longer than the width and the support contacts the touch device stack at a location that is approximately a fourth of the width from the first edge and less than a fourth of the length from the second edge. In various examples, the support allows the touch device stack to move laterally with respect to the flexure plate. In numerous examples, the electronic device further includes a strain gauge operably connected to the flexure plate and configured to produce a non-binary output in response to the deformation of the flexure plate.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
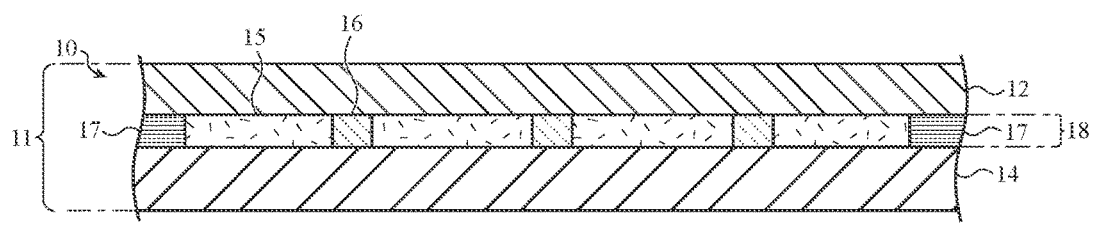
FIG. 1 depicts a computing structure having a laminate stack.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and apparatuses that embody various elements of the present disclosure. However, it should be understood that the described disclosure may be practiced in a variety of forms in addition to those described herein.

Computing structures formed from laminate stacks (e.g., various layers including outer covers, printed circuit boards, flex circuits, frames, and the like) perform significantly better when their flatness, stiffness and thickness are controlled. This is especially useful for input devices such as trackpads, touch panels and the like, that are incorporated into electronic devices and serve as a means for interacting with the electronic device (e.g., a laptop or the like). For lamination processes that use heat activated films, the laminate structures may have good stiffness but this may come at the expense of flatness. One reason for this may be unmatched thermal expansion of different layers, which causes residual stresses and warping. Alternatively, good flatness can be achieved with PSA but typically at the expense of stiffness. Further, liquid adhesives provide good stiffness and flatness, but may lack the ability to control thickness across an area.

The following embodiments are directed to computing structures (e.g., any laminated structure used in a computing or other electronic device, such as a trackpad or other input surfaces/structures, touch area, housing portion, and so on) with improved flatness, stiffness and thickness. In one embodiment, the laminate structure includes layers that are adhered to one another via a spacer and liquid adhesive. The spacer provides thickness control while the liquid adhesive enhances stiffness with both cooperating to maintain flatness. As will be appreciated, the configuration and characteristics of how the spacer and liquid adhesive are applied, can further improve the performance of the laminate structure/stack. For example, the placement, shape and dimensions relative to one another and the surrounding layers can be selectively provided to further aid in controlling the flatness, stiffness and thickness. Moreover, because the bonding can occur at a regulated temperature (such as "room temperature," or approximately 40-90 degrees Fahrenheit), there is less concern about unmatched thermal expansion of different material layers.

The following embodiments are directed to a computing structure. Some embodiments of the computing structure may be an input device such as a trackpad; the input device may have substantial rigidity over a defined input area and within a relatively thin profile. "Rigidity," as used herein, generally refers to resistance to bending. Rigid objects may be stiff and relatively inflexible. Rigid computing structures may be flat and stiff, and may have a reduced or minimal thickness as compared to conventional computing structures.

Embodiments described herein may be used to address the increasingly challenging design constraints associated with trackpads (or other input devices, or other computing structures) that are suitable for use in ultra-light notebooks and other similar electronic devices. Such input devices/structures may be rigid but thin in order to occupy less space in electronic devices. The improvements to the stiffness may be due, in part, to the construction and design of the various trackpad components. In particular, the lamination of a touch device stack, position of trackpad supports under the touch device stack, and/or the force-sensor beam configuration may be configured to provide a trackpad having acceptable stiffness over an increased input area and/or with a reduced overall thickness.

Some embodiments are directed to a lamination process that may have superior stiffness over a reduced thickness. The lamination process may use a unique combination of adhesives and processing techniques that result in very low shear or shifting between the various layers of a laminated stack that may form part of the trackpad assembly. The lamination process may also produce a stack having superior flatness and/or uniformity. The mechanical properties of the outer layers may also be selected to provide the necessary rigidity.

In general, a variety of different adhesives may be used to couple component layers, such as those of a trackpad, in a stack or other configuration. For example, heat activated film (HAF) may be used. Heat activated film may provide a high bonding strength. This may be significant for stiffness of the coupled components, as high bonding strength (particularly in shear directions) may result in an exponential stiffness of the individual components and the adhesive, whereas low bonding strength may result in merely a combination of the individual stiffness of these individual components and the adhesive because they are not strongly bonded together. However, coupling of component layers using heat can result in non-uniform or inconsistent thicknesses across the coupled component layers due to thermal mismatch of the component layers and/or HAF. This may be undesirable and may result in functional problems in some devices, such as where the component layers are components of a capacitor.

Pressure sensitive adhesive (PSA) may also be used. PSA may not use heat in coupling the component layers, preventing thermal mismatch from causing non-uniform or inconsistent thicknesses across the coupled component layers. However, PSA may not have high bonding strength and/or may have poor shear performance. As such, use of PSA alone may result in low stiffness.

Room-temperature-activated and/or cured liquid adhesives or similar adhesives may also be used. A room-temperature-activated liquid adhesive is any liquid adhesive that activates and/or cures without requiring the application of heat (room temperature being, for example, between approximately 32 and 120 degrees Fahrenheit). For example, some room-temperature-activated liquid adhesives activate and/or cure upon exposure to ultraviolet (UV) light. By way of another example, some room-temperature-activated liquid adhesives are multiple component adhesives (such as two-part epoxy) that activate and/or cure when the multiple components mix to cause a chemical reaction. Similar to PSA, room-temperature-activated liquid adhesives may not use heat in coupling the component layers, preventing thermal mismatch from causing non-uniform or inconsistent thicknesses across the coupled component layers. Room-temperature-activated liquid adhesives may also have a high bonding strength, resulting in high stiffness.

However, use of room-temperature-activated liquid adhesives alone may result in non-uniform or inconsistent thicknesses across the coupled component layers due to inability to control thickness across an area during application and curing.

However, as described herein, an adhesive system combining two or more adhesive types may be used to overcome the individual drawbacks of those adhesives used in isolation. The proposed system may achieve a stiff, flat laminate. Such a laminate may be used to form a touch sensitive component.

Uniform and/or consistent thickness of a touch sensitive component or other laminate may be significant for a number of reasons. The touch sensitive component may sense touch and/or proximity of an object such as a user's finger based on changes in capacitance of a component layer and the object. Variations in thickness across the touch sensitive component could result in capacitance change variations for the same touch and/or proximity at different locations. As the proposed system provides uniform and/or consistent thickness, such capacitance change variations may be prevented.

The following disclosure relates to a stack of layer components or substrates laminated together, such as the stack of a trackpad. The component stack includes at least a first layer component coupled to a second layer component by an adhesive system. The adhesive system includes a bonding component that may be a room-temperature-activated liquid adhesive, an adhesive-spacing component that may be a cured room-temperature-activated liquid adhesive, and an adhesive-alignment-holding component that may be PSA. The room-temperature-activated liquid adhesive bonds the components. The cured room-temperature-activated liquid adhesive maintains spacing during bonding. The PSA maintains alignment during bonding and defines an area for the room-temperature-activated liquid adhesive.

These and other embodiments are discussed below with reference to FIGS. 1-17D. However, those skilled in the art will readily appreciate that the detailed description given herein with respect to these Figures is for explanatory purposes only and should not be construed as limiting.

FIG. 1 depicts a cross sectional view of a computing structure 10 having a laminate stack 11. The laminate stack 11 includes a first layer 12 and a second layer 14 positioned below the first layer 12, although in other embodiments the second layer 14 may be next to, adjacent, abutting, or above the first layer 12. The first and second layers 12, 14 may be widely varied in composition and/or components. For example, they may include covers, housing components, touch sensing layers, displays, stiffeners, and so on, and may be formed from a variety of materials including glass, metal, plastic, ceramic, and the like, or combinations thereof.

In one embodiment, the first and second layers 12, 14 are coupled together (e.g., affixed, adhered, laminated, or otherwise bonded), for example with an adhesive layer 18 disposed therebetween. The adhesive layer 18 may include a bonding component 15 configured to bond the first layer 12 to the second layer 14. The adhesive layer 18 may also include a spacing component 16 configured to maintain spacing between the first and second layers 12, 14 during bonding. The adhesive layer 18 may further include an alignment-holding component 17 configured to maintain alignment of the first and second layers 12, 14 during bonding. The placement, shape and dimensions of each of these components may be widely varied.

In one example, the alignment-holding component 17 helps define a perimeter of the adhesive layer 18. In another example, the spacing component 16 may be positioned within the perimeter. In yet another example, the bonding component 15 may be positioned within the perimeter. In some cases, the bonding component 15 may fill the space within the perimeter around the spacing component 16. The bonding component 15, spacing component 16, and/or alignment holding component 17 may be widely varied.

In one example, the bonding component 15 is formed from a room-temperature curing liquid adhesive. In another example, the spacing component 16 is formed from a cured liquid adhesive. In various examples, the spacing component 16 is formed of the same liquid adhesive as the bonding component 15 in some examples. In some examples, liquid adhesive used to form the bonding component 15 and/or the spacing component 16 may have a higher stiffness and/or bonding strength than the alignment-holding component 17. In various examples, one or more of the bonding component 15, spacing component 16, and/or alignment-holding component 17 are dielectrically matched.

During bonding process, the alignment-holding component 17 and the spacing component 16 are typically in a rigid state with defined dimension while the bonding component 15 is in a liquid state and capable of flowing to fill the remaining space provided within the alignment-holding component 17 and the spacing component 16. Once dried the combination provides a secure and stiff layer that adheres the first and second layers 12,14 together in a manner that is flat, stiff and with a controlled thickness.

Figure 2A:
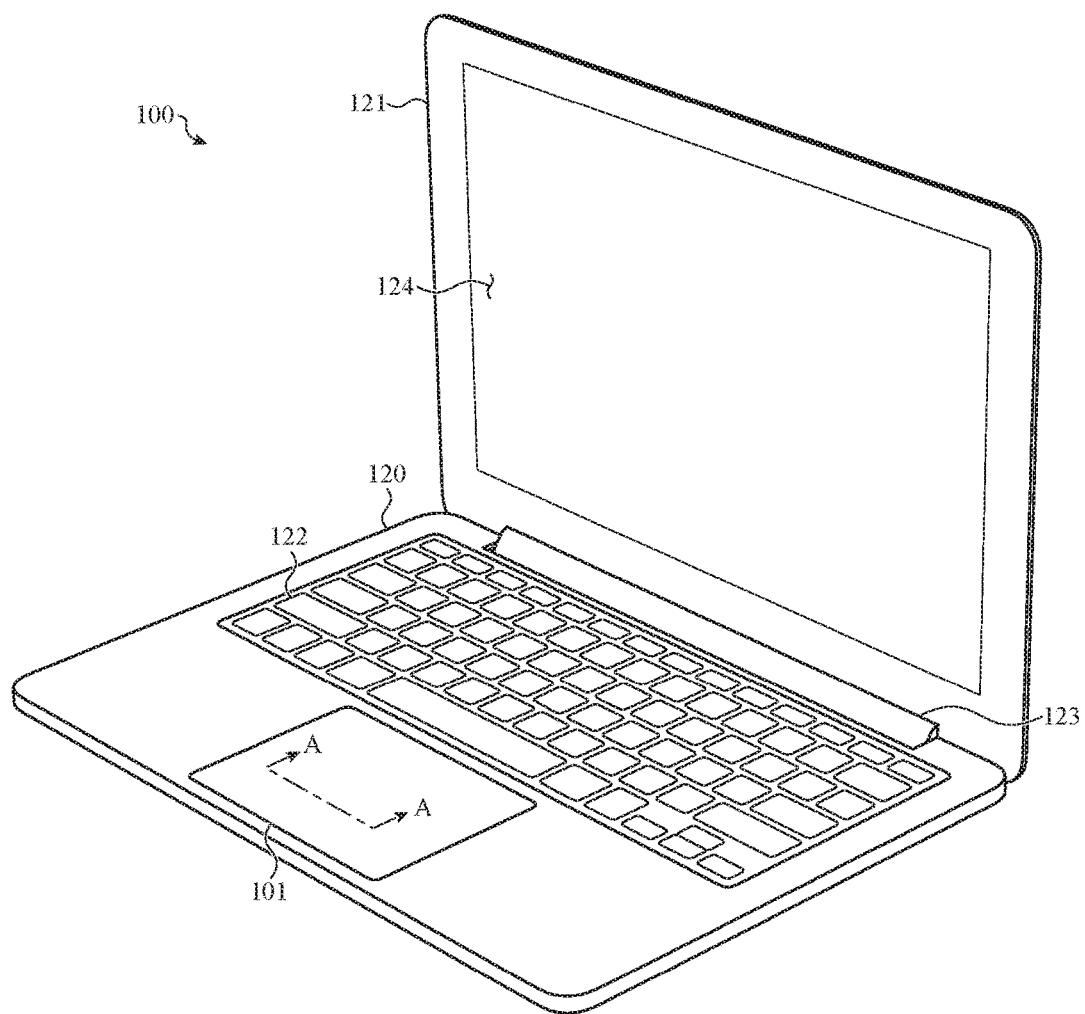
FIG. 2A depicts an electronic device that includes a trackpad or other touch device.

FIG. 2A depicts an electronic device 100 that includes a trackpad 101. The trackpad may also be referred to herein as an "input device" or "touch device," insofar as the trackpad 101 may detect touch input using various sensors and/or sensing layers. For example, the trackpad 101 may sense the touch and/or proximity of an object based on changes in a capacitance between capacitive elements. In some implementations, the trackpad 101 may also be configured to provide haptic and/or acoustic output.

As described with more detail below with regard to FIG. 3, the trackpad 101 may include a stack of layer components or substrates adhesively bonded together. The component stack may include a first layer component coupled to a second layer component by an adhesive system that is specially configured to provide a flat and stiff laminated structure with minimal thickness. As explained in more detail below, the adhesive system may include a bonding component, an adhesive-spacing component, and an adhesive-alignment-holding component. The bonding component, adhesive-spacing component, and adhesive-alignment-holding component may all be formed from the same (or different) adhesive, including a curable liquid adhesive In this example, the electronic device 100 is a laptop computing device including a number of components in addition to the trackpad 101. Such a laptop computing device may include a lower housing 120 connected to an upper housing 121 by a hinge 123. A display 124 may be coupled to the upper housing 121. Input/output devices such as keys 122 may be coupled to or otherwise incorporated into the lower housing 120. In some instance, keys 122 form a keyboard that is positioned at least partially within one or more openings of the lower housing 120.

Figure 2B:
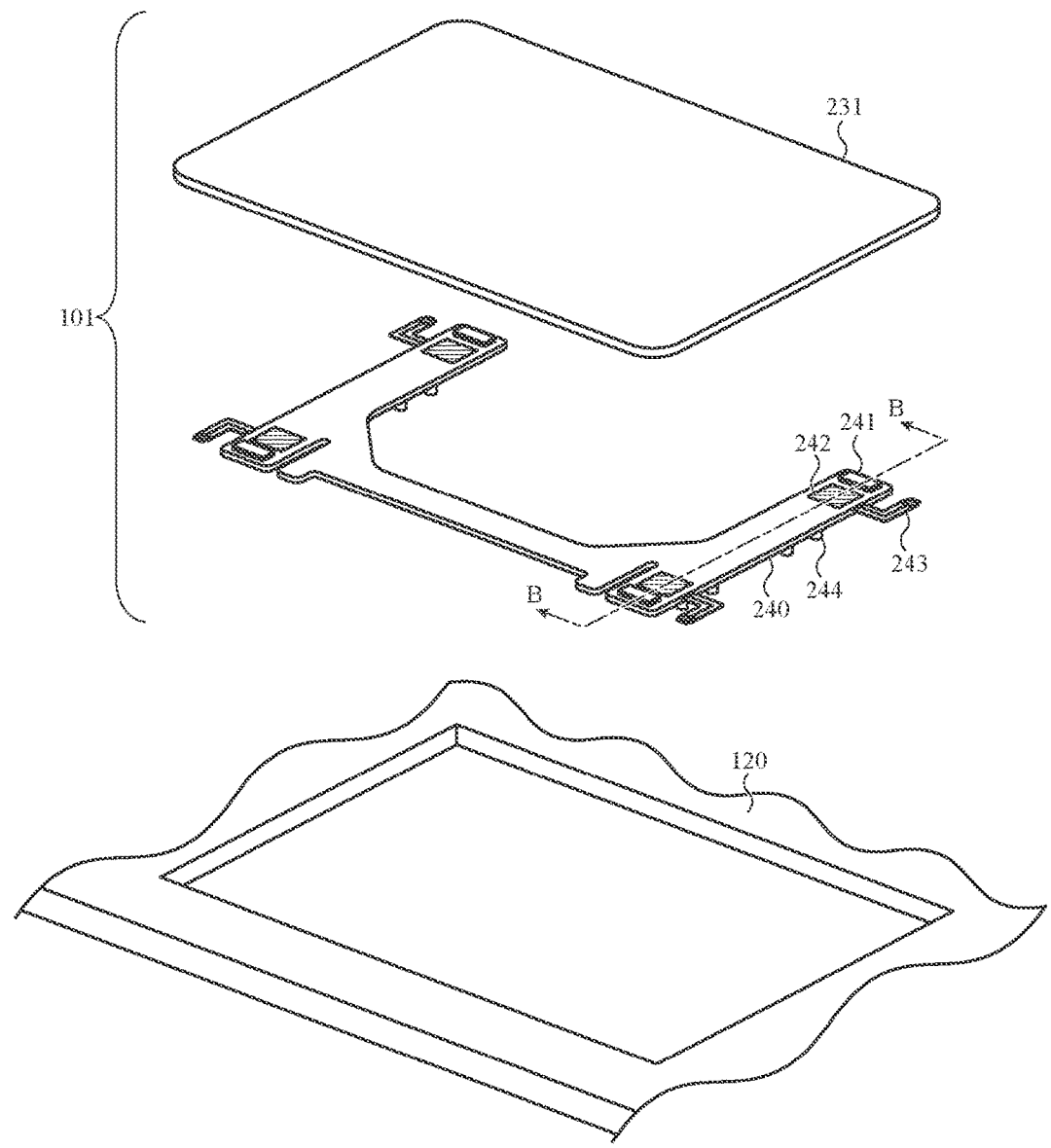
FIG. 2B depicts an example simplified exploded view of the trackpad of the electronic device of FIG. 2A.

FIG. 2B depicts an example simplified exploded view of the trackpad 101 of the electronic device 100 of FIG. 2A. The trackpad 101 includes a touch device stack 231 and a flexure plate 240. The flexure plate 240 attaches to the touch device stack 231 using supports 241 and to the housing 120 or other substrate within the housing 120 using anchors 244.

The flexure plate 240 supports the touch device stack 231, but also allows movement of the touch device stack 231 when force is applied.

As shown in FIG. 2B, some sides and/or edges of the flexure plate 240 may be substantially contiguous with, or otherwise aligned with, some sides and/or edges of the touch device stack 231. In some embodiments, sides and/or edges of the flexure plate 240 may abut some, but not all, sides and/or edges of the touch device stack 231, or may be parallel to some, but not all, sides and/or edges of the touch device stack. For example and as shown in FIG. 2B, the flexure plate 240 may be substantially C- or U-shaped. In such an embodiment, portions of two or three sides and/or edges may be substantially aligned with sides and/or edges of the touch device stack 231. A majority of a fourth side and/or edge or side of the touch device stack 231 may be unsupported (or not abutted by) the flexure plate 240. Similarly, the flexure plate may not underlie a center of the touch device stack 231, although in other embodiments it may.

Figure 2C:
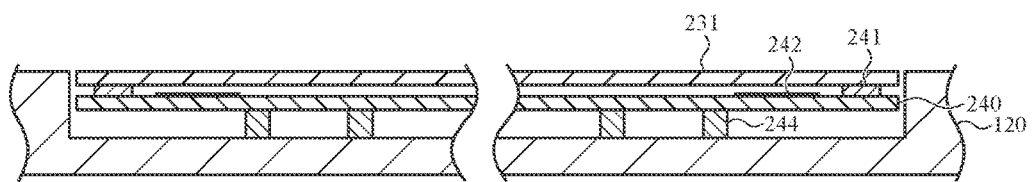
FIG. 2C depicts an example simplified cross-sectional view of the electronic device of FIG. 2B, taken along line B-B of FIG. 2B.

FIG. 2C depicts an example simplified cross-sectional view of the trackpad 101 of the electronic device of FIG. 2B, taken along line B-B of FIG. 2B. It should be noted that FIG. 2B shows an exploded view of the trackpad 101, while FIG. 2C shows the trackpad in an assembled state.

The flexure plate 240 may include one or more force sensors 242 that may produce a non-binary output that corresponds to an amount of force applied to the touch device stack 231. For example, the flexure plate 240 may include strain gauges 242 positioned on arm or other portions. Force applied to the touch device stack 231 may be transferred to the arms of the flexure plate 240 through the supports 241. The anchors 244 may provide a substantially rigid support allowing the arms of the flexure plate 240 to bend in a cantilever fashion. In some cases, the arms are configured to flex in the region where the strain gauges 242 are located allowing the touch device stack 231 to displace slightly in response to a force on the upper surface of the touch device stack.

The strain gauges 242 may flex or bend in response to an applied force, which may produce the non-binary output. The strain gauges 242 may be electrically coupled to one or more processing units or other controllers of the electronic device 100 of FIG. 2A via one or more flex tails 243 or other electrical conduits. The processing unit may receive the strain data, which may be used to estimate an amount of force applied to the touch device stack 231

The flexure plate 240 may be formed of a variety of different materials operable to support the touch device stack 231 and flex in order to provide a strain-based measurement using the strain gauges 242. The flexure plate 240 may be formed one or more layers of various materials including, for example, metals, conductive films, non-conductive films, plastic films, and so on. The strain gauges 242 or other force sensors may be formed using a variety of materials. For example, the strain gauges 242 may be formed of conductive traces embedded, laminated or otherwise incorporated into a flexible circuit. The flexible circuit may be at least electrically connected to the flex tails 243 or other terminal connection.

The dimensions (length, width, and height) of the flexure plate 240 may be configured to balance providing support for the touch device stack 231 with the ability to flex in order for the strain gauges 242 to be able to detect force applied to the touch device stack 231. In order to maintain the balance between support and the ability to flex, the relationship between the length, width, and/or height may be configured to provide the desired characteristics. In one example configuration, the flexure plate 240 may be between 5 and 15 millimeters in length, 5 and 25 millimeters in width, and 0.25 and 1.0 millimeters in thickness although the specific values and ranges may vary depending on the implementation.

Figure 2D:
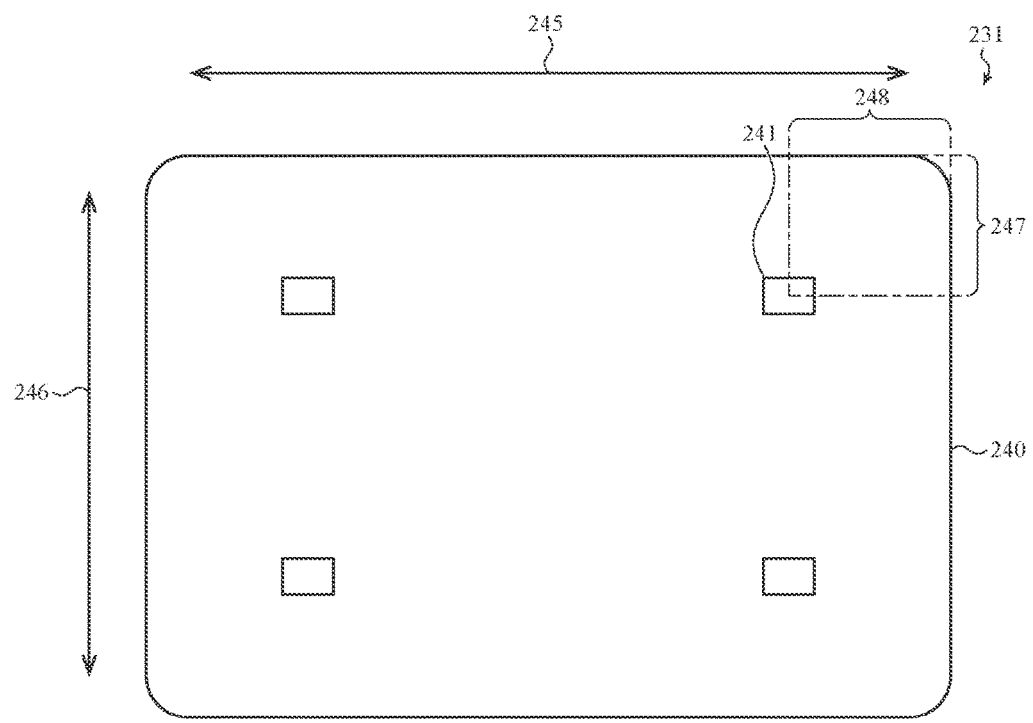
FIG. 2D depicts a bottom view of the touch device stack and the supports of the trackpad of FIGS. 1B-1C with other components removed for clarity.

FIG. 2D depicts a bottom view of the touch device stack 231 and the supports 241 of the trackpad 101 of FIGS. 2B-2C with other components removed for clarity. As shown in FIG. 2C, the supports 241 are positioned between the flexure plate 240 and the touch device stack 231. In some instances, the supports 241 are formed from a compliant material that allows movement of the touch device stack 231 in one or more lateral directions. In some cases, the supports 241 are formed from a compliant material, such as a gel. Lateral movement of the touch device stack 231 may be used to provide a haptic or tactile output. In some implementations, an actuator may be coupled to one or more components of the touch device stack 231 and/or the flexure plate 240. The actuator may be operable to move the touch device stack 231 laterally with respect to the flexure plate 240, which may be perceptible to a user touching the touch device stack 231 as haptic output.

The position of the supports 241 with respect to the touch device stack 231 may be significant in the support provided to the touch device stack 231. For example, the supports 241 may be positioned to support the touch device stack 231 and allow movement without allowing the touch device stack 231 or components thereof to significantly bend or otherwise deform. In this way, the supports 241 and/or the flexure plate 240 contribute to the stiffness of the touch device stack 231.

For example, with reference to FIG. 2D, the touch device stack 231 may have a length 245 and a width 246. The supports 241 may be positioned a first distance 247 from a first edge of the touch device stack 231 along which the length 245 is measured. The supports 241 may also be positioned a second distance 248 from a second edge of the touch device stack 231 along which the width 246 is measured. The first distance 247 may vary between 15% and 35% of the width 246 and the second distance 248 may be less than approximately 35% the length 245. In one example, the first distance 247 may be approximately a fourth of the width from the first edge, and the second distance 248 may be less than a fourth of the length from the second edge.

Figure 3:
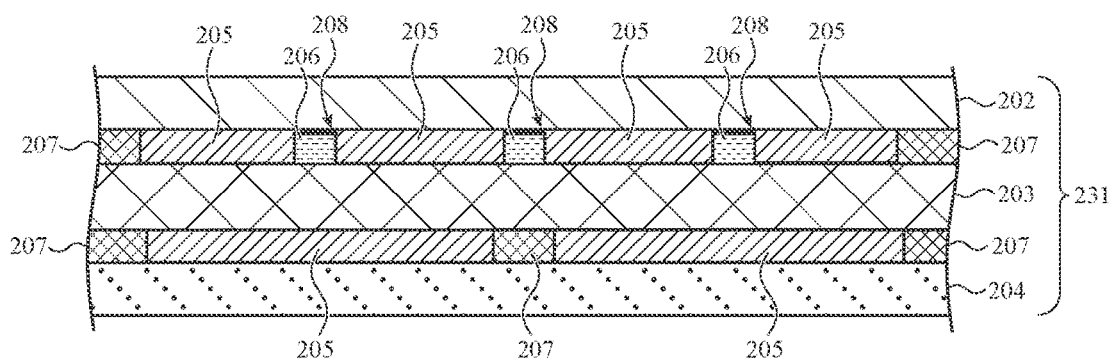
FIG. 3 depicts an example simplified cross-sectional view of the trackpad of the electronic device of FIG. 2A, taken along line A-A of FIG. 2A, with the flexure plate removed for clarity.

FIG. 3 depicts an example simplified cross-sectional view of the trackpad 101 of the electronic device 100 of FIG. 2A, taken along line A-A of FIG. 2A, with the flexure plate 240 removed for clarity. The touch device stack 231 includes a cover layer component 202 or substrate (such as a glass layer component, cover component, glass layer, cover layer, cover, cover glass, transparent cover, and so on), a touch-sensing layer component 203 or substrate (for example, a printed circuit board), and a stiffener layer component 204 or substrate (e.g., a metal structure, plastic structure, ceramic structure, or other suitable component).

Adhesive systems or layers may couple the cover layer component 202, the touch-sensing layer component 203, and the stiffener layer component 204 together in a way that provides stiffness and uniform thickness. The touch-sensing layer component 203 may be operable to detect position, movement, force, and so on of touches to the cover layer component 202. For example, the touch-sensing layer component 203 may be a mutual and/or self-capacitive sensing component that determines proximity, touch, and so on of an object based on capacitances between the object and the sensing component. The cover layer component 202 may protect the touch-sensing layer component 203. The stiffener layer component 204 may provide stiffness to the touch-sensing layer component 203.

The touch device stack 231 includes a first adhesive system that couples the cover layer component 202 to the touch-sensing layer component 203. The first adhesive system includes a bonding component that is an array of cured room-temperature-activated liquid adhesive 205. The cured room-temperature-activated liquid adhesive 205 bonds the cover layer component 202 to the touch-sensing layer component 203. The first adhesive system also includes an adhesive-spacing component that includes columns of cured room-temperature-activated liquid adhesive 206. The columns of cured room-temperature-activated liquid adhesive 206 maintain spacing between the cover layer component 202 and the touch-sensing layer component 203 during curing of the room-temperature-activated liquid adhesive 205. The first adhesive system further includes an adhesive-alignment-holding component, which is PSA 207, that maintains alignment of the cover layer component 202 and the touch-sensing layer component 203 during curing of the room-temperature-activated liquid adhesive 205 and defines an area or volume around the columns of cured room-temperature-activated liquid adhesive 206 that are filled with the room-temperature-activated liquid adhesive 205. The PSA 207 may have a lower bonding strength than the room-temperature-activated liquid adhesive 205.

The bonding component of the first adhesive system contributes to stiffness of the touch device stack 231. The bonding of the cover layer component 202 to the touch-sensing layer component 203 by the cured room-temperature-activated liquid adhesive 205 is strong in multiple modes, including shear modes. The bonding may resist shear. As such, the rigidity of the touch device stack 231 may be that of the surface placed in compression by an applied force and the surface placed in tension from the applied force. The touch device stack 231 positions the cover layer component 202 and the touch-sensing layer component 203 furthest from the neutral axis of an applied force, making the rigidity of the touch device stack 231 dependent on the cover layer component 202 and the touch-sensing layer component 203 regardless of rigidity in between due to the resistance to shear. As such, the stiffness of the stack component including the cover layer component 202, the touch-sensing layer component 203, and the first adhesive system is the combined moment of inertia of these three layers as opposed to merely a combination of the individual moments of each as may be the case if the bonding was weaker. Durability and/or reliable functioning of the trackpad 101 may depend on the stiffness of the touch device stack 231.

The adhesive-spacing component and the adhesive-alignment-holding component of the first adhesive system both contribute to uniform and/or consistent thickness of the touch device stack 231 across the first adhesive system. By maintaining spacing of the cover layer component 202 and the touch-sensing layer component 203 during curing of the room-temperature-activated liquid adhesive 205, the columns of cured room-temperature-activated liquid adhesive 206 allow high strength bonding from using the room-temperature-activated liquid adhesive 205 by mitigating the thickness variations that use of the room-temperature-activated liquid adhesive 205 to bond might otherwise cause. Thus, the columns of cured room-temperature-activated liquid adhesive 206 can contribute to stiffness of the touch device stack 231 by allowing use of the room-temperature-activated liquid adhesive 205, despite not even being bonded to the cover layer component 202 at un-bonded regions 208 in some implementations.

By defining the area filled with the room-temperature-activated liquid adhesive 205 and by maintaining alignment of the cover layer component 202 and the touch-sensing layer component 203 during curing of the room-temperature-activated liquid adhesive 205, the PSA 207 also mitigates the thickness variations that use of the room-temperature-activated liquid adhesive 205 to bond might otherwise cause. Thus, the PSA 207 can contribute to stiffness of the touch device stack 231 by allowing use of the room-temperature-activated liquid adhesive 205.

The PSA 207 may also be configured to form one or more gaps and/or other spaces (see FIG. 9) that connect the area filled with the room-temperature-activated liquid adhesive 205 with an external environment. These gaps may be configured to vent gas and/or allow air, other gas, bubbles, and so on to escape as the room-temperature-activated liquid adhesive 205 cures, preventing trapped bubbles from impairing the strength of the bond and/or uniform and/or consistent thickness across the first adhesive system.

Additionally, the room temperature activation and/or curing of the cured room-temperature-activated liquid adhesive 205 may also contribute to uniform and/or consistent thickness of the touch device stack 231. As the room-temperature-activated liquid adhesive 205 activates and/or cures at room temperature (room temperature being, for example, between approximately 32 and 120 degrees Fahrenheit), heat may not be applied to activate and/or cure the room-temperature-activated liquid adhesive 205. As heat may not be applied, thermal mismatch between the components may not be caused by heating. Therefore, the touch device stack 231 may have a more uniform and/or consistent thickness than if heat were applied to activate and/or cure the room-temperature-activated liquid adhesive 205.

Moreover, the flexure plate 240 of FIGS. 2B-2D may contribute to stiffness of the touch device stack 231. The flexure plate 240 of FIGS. 2B-2D may support the touch device stack 231 using the supports 241 in such a way as to reduce bending or other deformation of the touch device stack 231. This will be described in further detail below.

Uniform and/or consistent thickness of the touch device stack 231 may be significant for the trackpad 101 for a number of reasons. The touch-sensing layer component 203 may sense touch and/or proximity of an object such as a user's finger to the cover layer component 202. The touch-sensing layer component 203 may sense the touch and/or proximity of the object based on changes in capacitance of a capacitor formed by the touch-sensing layer component 203 and the object where the first adhesive system and/or the cover layer component 202 function as the dielectric of the capacitor. Touch and/or proximity of the object may change the capacitance of the capacitor, and such capacitive changes may be evaluated to determine touch and/or proximity of the object to a particular portion of the cover layer component 202. As the first adhesive system functions as the dielectric of the capacitor, variations in thickness across the adhesive system could result in capacitance change variations for the same touch and/or proximity at different locations. As the first adhesive system provides uniform and/or consistent thickness, such capacitance change variations may be prevented.

Further, as the first adhesive system functions as the dielectric of a capacitor, one or more of the components of the first adhesive system may be configured such that they are dielectrically matched. Dielectric matching of the components of the first adhesive system may further prevent capacitance change variations for the same touch and/or proximity at different locations. For example, the cured room-temperature-activated liquid adhesive 205 and the columns of cured room-temperature-activated liquid adhesive 206 of the first adhesive system may be formed of a common material (e.g., the same room-temperature-activated liquid adhesive) and may thus inherently dielectrically match. In various implementations, the PSA 207 of the first adhesive system may be selected to dielectrically match the cured room-temperature-activated liquid adhesive 205 and/or the columns of cured room-temperature-activated liquid adhesive 206 of the first adhesive system.

The adhesive systems, the flexure plate 240 of FIGS. 2B-2D, and the other features described above may all contribute to stiffness and/or uniform and/or consistent thickness of the touch device stack 231 and/or the trackpad 101. As a result of these various features, larger yet thinner trackpads 101 may be constructed than were previously possible. In some examples, the trackpad may have lengths and widths of approximately 135 millimeters by 85 millimeters, or even 160 millimeters by 115 millimeters or more, while being approximately only 2 millimeters thick.

However, although the first adhesive system is illustrated and described as including a particular set of materials and configuration for the bonding component, the adhesive-spacing component, and the adhesive-alignment-holding component, it is understood that this is an example. In various implementations, other materials and/or configurations may be used for the bonding component, the adhesive-spacing component, and/or the adhesive-alignment-holding component without departing from the scope of the present disclosure.

For example, the touch device stack 231 further includes a second adhesive system that includes different materials arranged in a different configuration and couples the touch-sensing layer component 203 to the stiffener layer component 204. The second adhesive system includes a bonding component, which is the cured room-temperature-activated liquid adhesive 205, that bonds the touch-sensing layer component 203 to the stiffener layer component 204. The second adhesive system also includes an adhesive-spacing component, which is the PSA 207, that maintains spacing between the touch-sensing layer component 203 and the stiffener layer component 204 during curing of the room-temperature-activated liquid adhesive 205. The second adhesive system further includes an adhesive-alignment-holding component, which is also the PSA 207, that maintains alignment of the touch-sensing layer component 203 and the stiffener layer component 204 during curing of the room-temperature-activated liquid adhesive 205 and defines an area that is filled with the room-temperature-activated liquid adhesive 205.

Thus, contrasted with the first adhesive system, the bonding component of the second adhesive system is formed of a different material than the adhesive-spacing component of the second adhesive system. As further contrasted with the first adhesive system, the adhesive-spacing component of the second adhesive system is formed of the same material as the adhesive-alignment-holding component of the second adhesive system. As additionally contrasted with the first adhesive system, use of the PSA 207 as the adhesive-spacing component of the second adhesive system may not result in un-bonded regions 208 unlike the columns of cured room-temperature-activated liquid adhesive 206 used as the adhesive-spacing component of the first adhesive system.

However, although the first and second adhesive systems are illustrated and described as including different materials arranged in different configurations, it is understood that this is an example. In various implementations, the first and second adhesive systems may be the same, use similar materials arranged in similar configurations, and so on without departing from the scope of the present disclosure. Additionally, in various implementations, the first and second adhesive systems may be switched, replaced with other configurations of other materials, and so on.

Further, although the PSA 207 is illustrated and described as forming a perimeter around the columns of cured room-temperature-activated liquid adhesive 206 defining an area within that perimeter that is filled with the room-temperature-activated liquid adhesive 205, it is understood that this is an example. In other implementations, the PSA 207 may be otherwise arranged, such as at the center or corners of the touch-sensing layer component 203 and so on, and cured room-temperature-activated liquid adhesive may be used (such as cured room-temperature-activated liquid adhesive formed on the touch-sensing layer component 203 by screen printing or stencil printing) to form the perimeter and define the area that is filled with the room-temperature-activated liquid adhesive 205.

Figure 4:
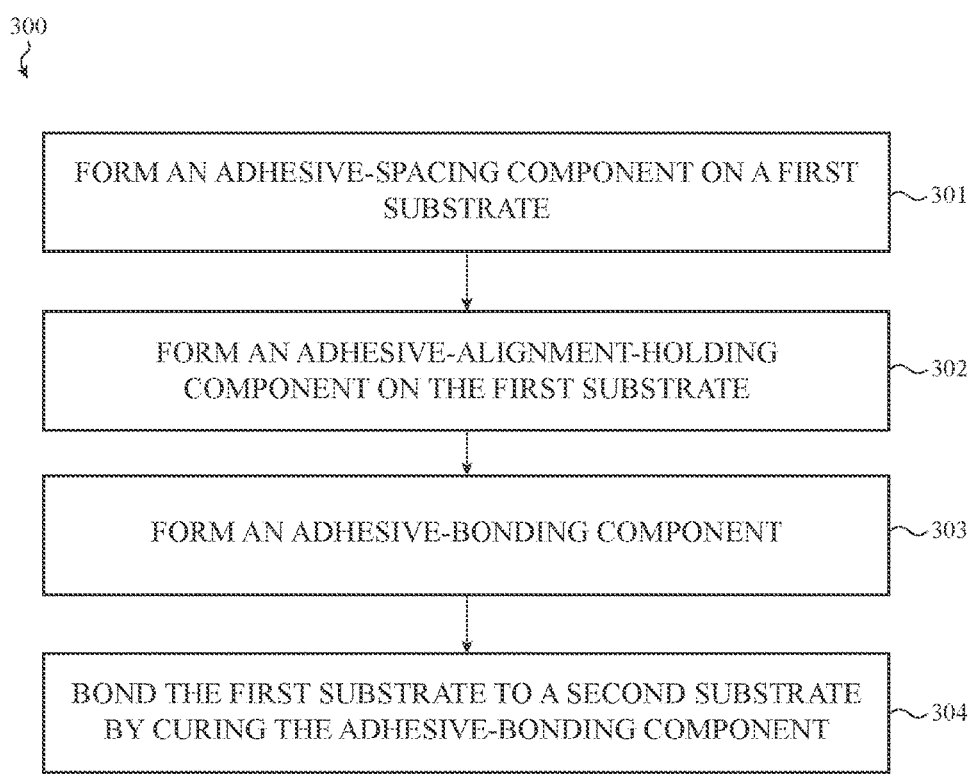
FIG. 4 depicts a flow chart illustrating a first example method for laminating components of a touch device stack. This first example method may be used to assemble the touch device stack of the trackpad of FIG. 3.

FIG. 4 depicts a flow chart illustrating a first example method 300 for laminating components of a touch device stack. This first example method 300 may be used to assemble the touch device stack 231 of the trackpad 101 of FIG. 3.

At 301, an adhesive-spacing component is formed on a first substrate. For example, see FIGS. 5A-5C. The first substrate may be a first touch device stack component. The adhesive-spacing component may be operable to maintain space between the first substrate and a second substrate (such as a second touch device stack component) during curing of a bonding component that bonds the first and second substrates. The adhesive-spacing component may be a cured room-temperature-activated liquid adhesive, PSA, and so on.

At 302, an adhesive-alignment-holding component is formed on the first substrate. For example, see FIG. 6D. The adhesive-alignment-holding component may form a perimeter around the adhesive-spacing component. The adhesive-alignment-holding component may define an area or perimeter, which may be around the adhesive-spacing component, into which the bonding component that bonds the first and second substrates will be applied. One or more gaps may be defined in the adhesive-alignment-holding component between the area and an external environment to allow air, gas, bubbles, and so on to escape from the bonding component during curing.

At 303, the bonding component is formed on the first substrate. For example, see FIGS. 6A-6E. The bonding component may be applied in the area (or within the perimeter) defined around the adhesive-alignment-holding component and/or the adhesive-spacing component. The bonding component may be operable to bond the first and second substrates.

At 304, the first and second substrates are bonded by bringing the first and second substrates into proximity and curing the bonding component. For example, see FIGS. 6E-6F. During the curing, the adhesive-spacing component may maintain space between the first and second substrates while the adhesive-alignment-holding component maintains alignment of the first and second substrates.

Although the first example method 300 is illustrated and described as including particular operations performed in a particular order, it is understood that this is an example. In various implementations, various orders of the same, similar, and/or different operations may be performed without departing from the scope of the present disclosure.

For example, the second example method 300 is illustrated and described as forming the adhesive-spacing component and the adhesive-alignment-holding component as separate, linearly performed operations. However, in various implementations, these components may be formed at approximately the same time without departing from the scope of the present disclosure. Further, in some implementations, these components may be formed as a single component that performs both functions.

Additionally, though the second example method 300 is illustrated and described as coupling first and second substrates, it is understood that this is an example. In various implementations, a variety of components may be coupled without departing from the scope of the present disclosure.

FIGS. 4A-4C depict a flow chart illustrating a second example method 400A-400C for laminating components of a touch device stack. This second example method 400A-400C may be used to assemble the touch device stack 231 of the trackpad 101 of FIG. 3.

Figure 5A:
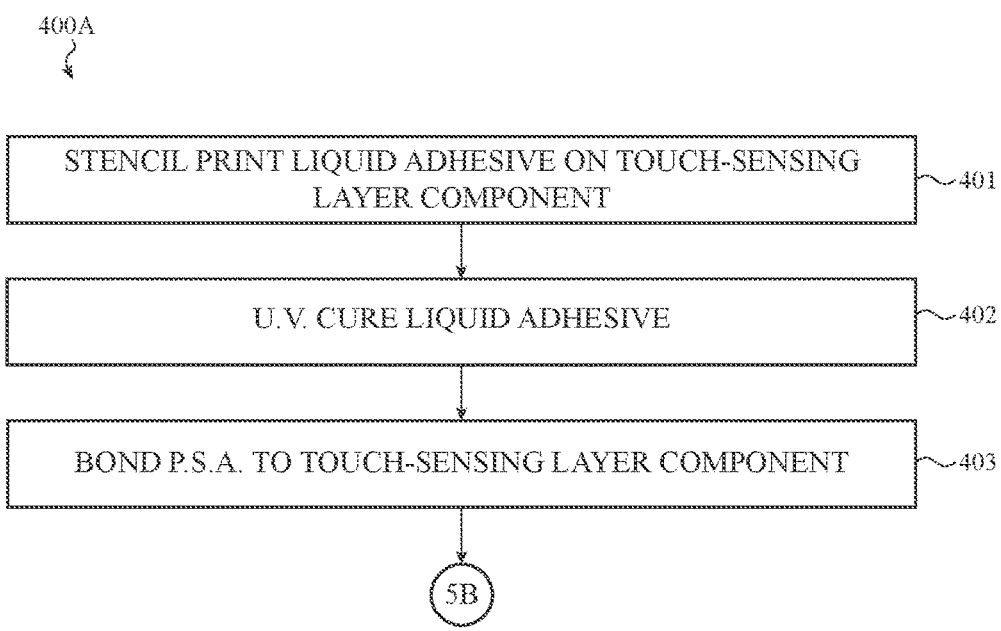
FIG. 5A depicts a first portion of a flow chart illustrating a second example method for laminating components of a touch device stack. This second example method may be used to assemble the touch device stack of the trackpad of FIG. 3.

With reference to a first portion 400A illustrated in FIG. 5A, at 401, a room-temperature-activated liquid adhesive may be printed on a touch-sensing layer component or substrate. The printing may be stencil printing. The stencil printing may form an array of columns of the room-temperature-activated liquid adhesive. At 402, the printed room-temperature-activated liquid adhesive on the touch-sensing layer component is cured. The printed room-temperature-activated liquid adhesive on the touch-sensing layer component may be cured by the application of UV light. At 403, PSA is bonded to the touch-sensing layer component to form an intermediate component. The PSA may be bonded in a perimeter around the cured room-temperature-activated liquid adhesive on the touch-sensing layer component. The perimeter may define an area for additional room-temperature-activated liquid adhesive to be applied. The PSA may be configured with one or more gaps connecting the area with an external environment to allow air, gas, bubbles, and so on to escape from such additional room-temperature-activated liquid adhesive during curing.

Figure 5B:
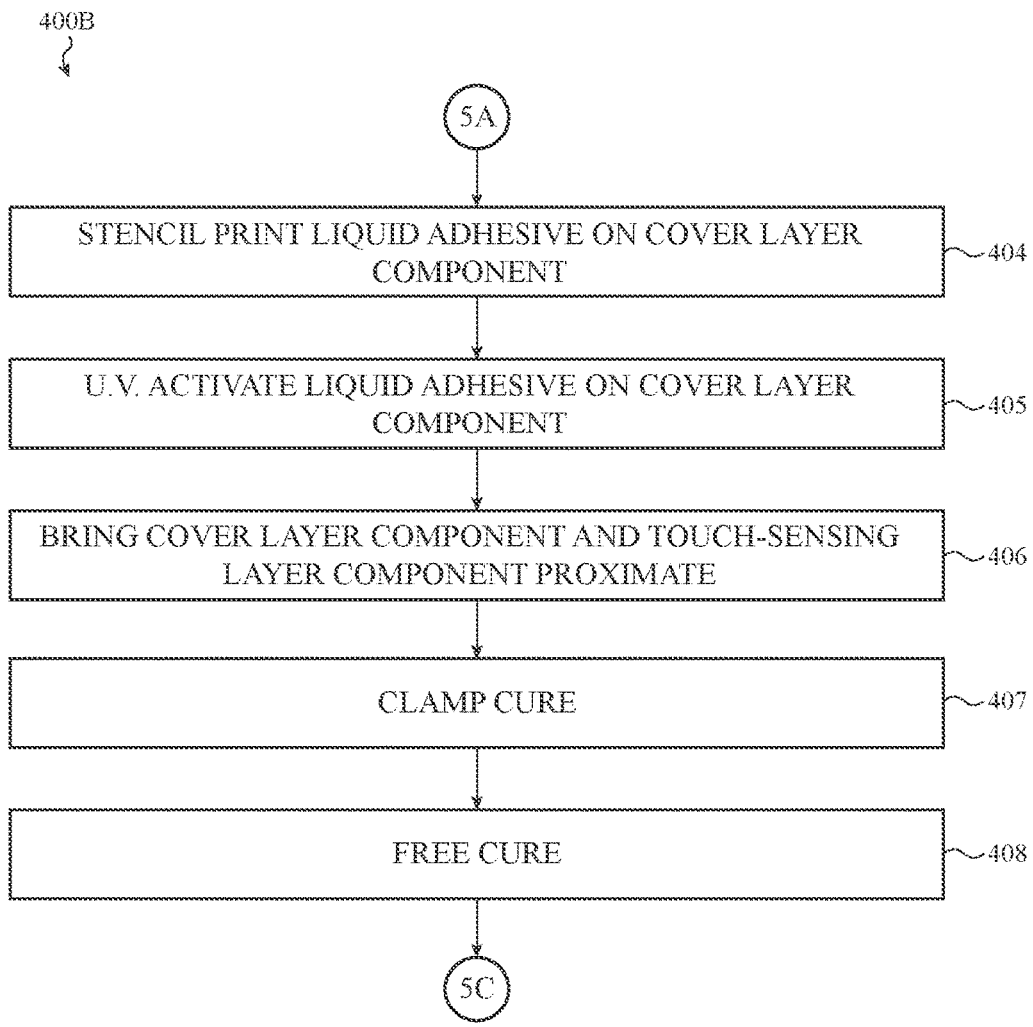
FIG. 5B depicts a second portion of a flow chart illustrating a second example method for laminating components of a touch device stack.

With reference to a second portion 400B illustrated in FIG. 5B, at 404, room-temperature-activated liquid adhesive may be printed on a cover layer component or substrate. The room-temperature-activated liquid adhesive on the cover layer component may be printed using stencil printing. At 405, the room-temperature-activated liquid adhesive on the cover layer component is activated. The room-temperature-activated liquid adhesive on the cover layer component may be activated by the application of UV light.

At 406, the cover layer component and the intermediate component produced at 403, including the touch-sensing layer component, are brought into proximity. Bringing the cover layer component and the touch-sensing layer component into proximity causes the activated room-temperature-activated liquid adhesive on the cover layer component to enter and fill the area defined by the PSA on the touch-sensing layer component around the columns of cured room-temperature-activated liquid adhesive on the touch-sensing layer component. At 407, the activated room-temperature-activated liquid adhesive may be cured while clamped by clamping the cover layer component and the touch-sensing layer component together. At 408, the activated room-temperature-activated liquid adhesive may be free cured, producing a first stack, by unclamping the cover layer component and the touch-sensing layer component and allowing the activated room-temperature-activated liquid adhesive to finish curing.

Figure 5C:
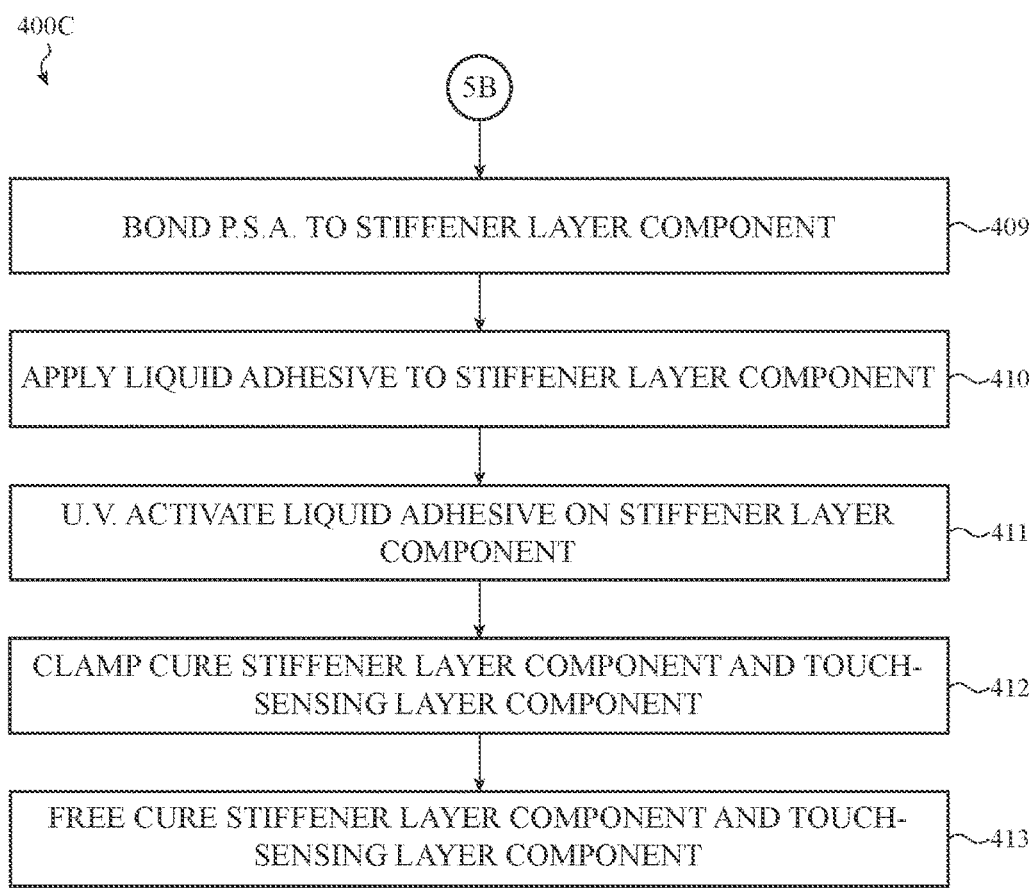
FIG. 5C depicts a third portion of a flow chart illustrating a second example method for laminating components of a touch device stack.

With reference to a third portion 400C illustrated in FIG. 5C, at 409, PSA is bonded to a stiffener layer component or substrate. The PSA on the stiffener layer component may define an area for room-temperature-activated liquid adhesive to be applied. At 410, room-temperature-activated liquid adhesive is applied in the area defined by the PSA. At 411, the room-temperature-activated liquid adhesive on the stiffener layer component is activated. The room-temperature-activated liquid adhesive on the stiffener layer component may be activated by the application of UV light.

At 412, the activated room-temperature-activated liquid adhesive on the stiffener layer component may be cured while clamped by bringing the stiffener layer component and the first stack, including the touch-sensing layer component, together and clamping. The stiffener layer component may be brought into proximity with a surface of the touch-sensing layer component that opposes the surface to which the cover layer component is coupled. At 413, the activated room-temperature-activated liquid adhesive on the stiffener layer component may be free cured, producing a second stack, by unclamping the stiffener layer component and the touch-sensing layer component and allowing the activated room-temperature-activated liquid adhesive on the stiffener layer component to finish curing.

Although the first example method 400A-400C is illustrated and described as including particular operations performed in a particular order, it is understood that this is an example. In various implementations, various orders of the same, similar, and/or different operations may be performed without departing from the scope of the present disclosure.

For example, the first example method 400A-400C is illustrated and described as activating but not curing the room-temperature-activated liquid adhesive on the cover layer component and the stiffener layer component using UV light. This may be due to the cover layer component, the touch-sensing layer component, and/or the stiffener layer component being opaque to UV light and/or transparent to UV light but including one or more coatings or other materials (such as a layer of opaque paint on an otherwise transparent cover layer component). However, in other implementations, one or more such layers may be transparent and such room-temperature-activated liquid adhesive may be cured as well as activated by using UV light.

Further, although the second example method 400A-400C is illustrated and described as coupling a cover layer component, touch-sensing layer component, and a stiffener layer component, it is understood that this is an example. In various implementations, any component layers or substrates may be coupled using one or more of the techniques described above.

FIGS. 5A-7E illustrate example operations in laminating components or substrates of a touch device stack to assemble the touch device stack 231 of the trackpad 101 of FIG. 3. These example operations may correspond to the operations of the second example method 400A-400C.

Figure 6A:
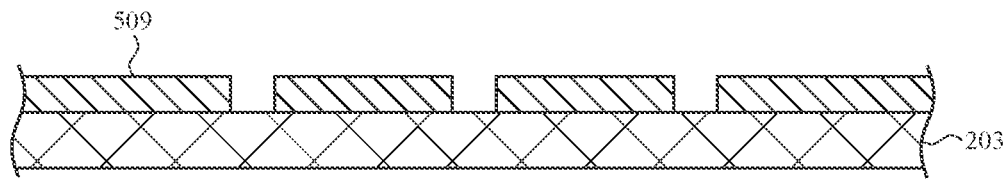
FIG. 6A depicts a first example operation in laminating components of a touch device stack to assemble the touch device stack of the trackpad of FIG. 3 where a screen mask is placed on a touch-sensing layer component.
Figure 6B:
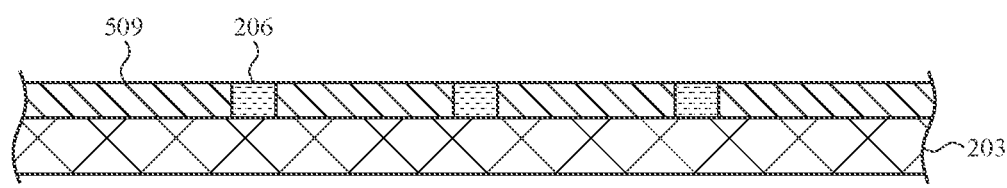
FIG. 6B depicts a second example operation in laminating components of a touch device stack to assemble the touch device stack of the trackpad of FIG. 3 where room-temperature-activated liquid adhesive that will become the adhesive-spacing component is applied to the touch-sensing layer component.
Figure 6C:
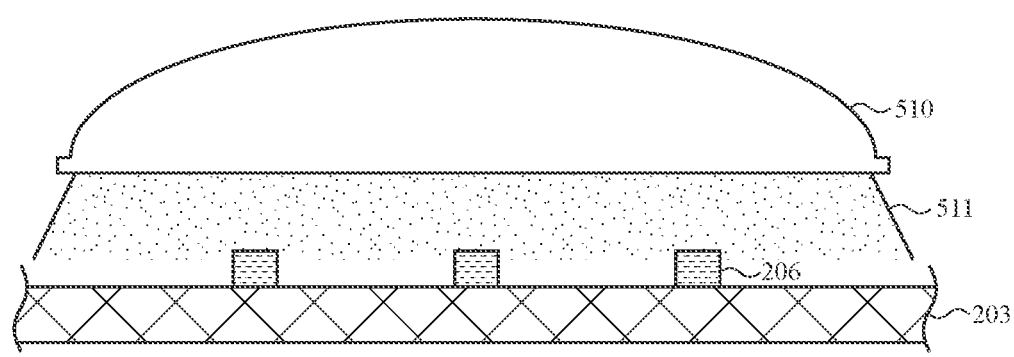
FIG. 6C depicts a third example operation in laminating components of a touch device stack to assemble the touch device stack of the trackpad of FIG. 3 where the room-temperature-activated liquid adhesive that will become the adhesive-spacing component is cured using UV light.

As illustrated in FIG. 6A, a screen mask 509 is placed on a touch-sensing layer component 203. The screen mask 509 includes material that covers portions of the touch-sensing layer component 203. The screen mask 509 also defines holes where room-temperature-activated liquid adhesive 206 may be applied to the touch-sensing layer component 203. As illustrated in FIG. 6B, room-temperature-activated liquid adhesive 206 that will become the adhesive-spacing component is applied to the touch-sensing layer component 203 through the holes in the screen mask 509. Thus, the room-temperature-activated liquid adhesive 206 that will become the adhesive-spacing component is formed into columns by the holes in the screen mask 509. As illustrated in FIG. 6C, the room-temperature-activated liquid adhesive 206 that will become the adhesive-spacing component is cured using UV light 511. The screen mask 509 is removed and the UV light 511 is directed on the room-temperature-activated liquid adhesive 206 that will become the adhesive-spacing component by a UV light source 510 to cure the room-temperature-activated liquid adhesive 206.

Figure 6D:
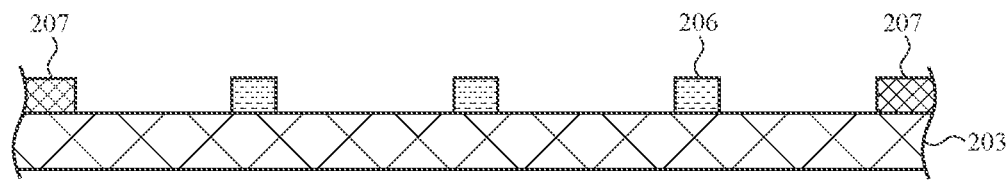
FIG. 6D depicts a fourth example operation in laminating components of a touch device stack to assemble the touch device stack of the trackpad of FIG. 3 where the adhesive-alignment-holding component is bonded to the touch-sensing layer component.

As illustrated in FIG. 6D, the adhesive-alignment-holding component is bonded to the touch-sensing layer component 203, producing an intermediate component. As shown, the adhesive-alignment-holding component, PSA 207, is bonded to the touch-sensing layer component 203 to form a perimeter around the columns of cured room-temperature-activated liquid adhesive 206 and define an area into which the room-temperature-activated liquid adhesive 205 that will become the bonding component will be applied.

Figure 7A:
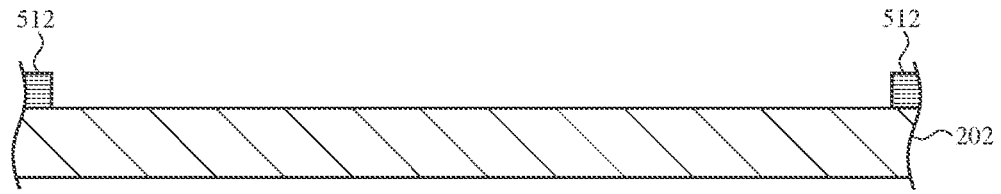
FIG. 7A depicts a fifth example operation in laminating components of a touch device stack to assemble the touch device stack of the trackpad of FIG. 3 where a screen mask is placed on a cover layer component.
Figure 7B:
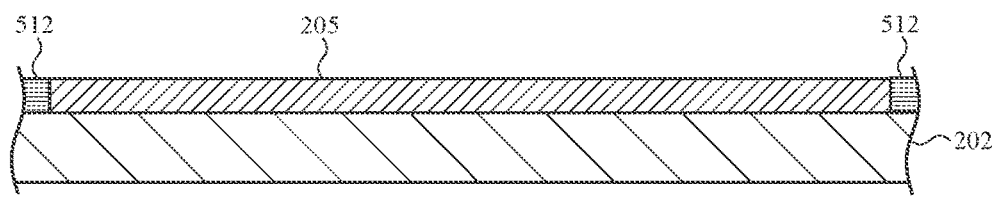
FIG. 7B depicts a sixth example operation in laminating components of a touch device stack to assemble the touch device stack of the trackpad of FIG. 3 where room-temperature-activated liquid adhesive that will become the bonding component is applied to the cover layer component through a hole in the screen mask.
Figure 7C:
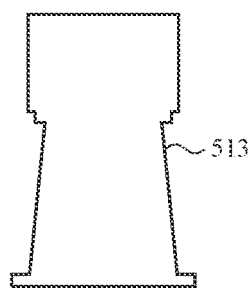
FIG. 7C depicts a seventh example operation in laminating components of a touch device stack to assemble the touch device stack of the trackpad of FIG. 3 where a three dimensional inspection component verifies surface uniformity of the room-temperature-activated liquid adhesive that will become the bonding component.
Figure 7C:
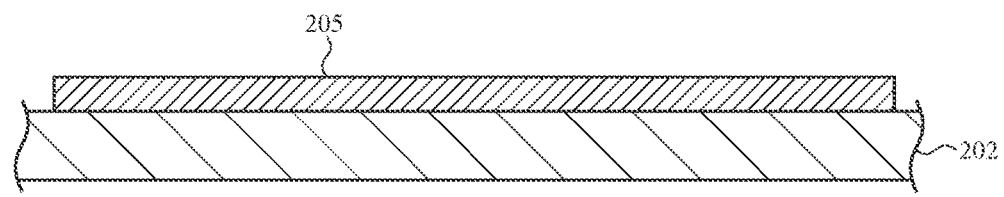

As illustrated in FIG. 7A, a screen mask 512 is placed on a cover layer component 202. The screen mask 512 includes material that covers portions of the cover layer component 202 and defines a hole where room-temperature-activated liquid adhesive 205 may be applied to the cover layer component 202. As illustrated in FIG. 7B, room-temperature-activated liquid adhesive 205 that will become the bonding component is applied to the cover layer component 202 through a hole in the screen mask 512. As illustrated in FIG. 7C, a three dimensional inspection component 513 verifies surface uniformity of the room-temperature-activated liquid adhesive 205 that will become the bonding component. The screen mask 512 is removed prior to verification.

Figure 7D:
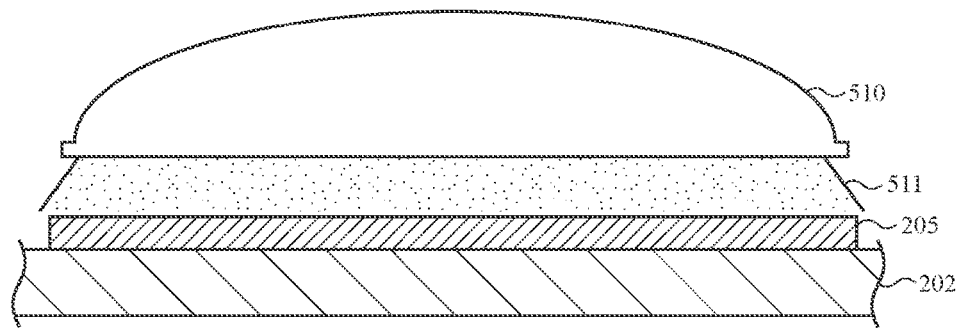
FIG. 7D depicts an eighth example operation in laminating components of a touch device stack to assemble the touch device stack of the trackpad of FIG. 3 where the room-temperature-activated liquid adhesive that will become the bonding component is activated using UV light.
Figure 7E:
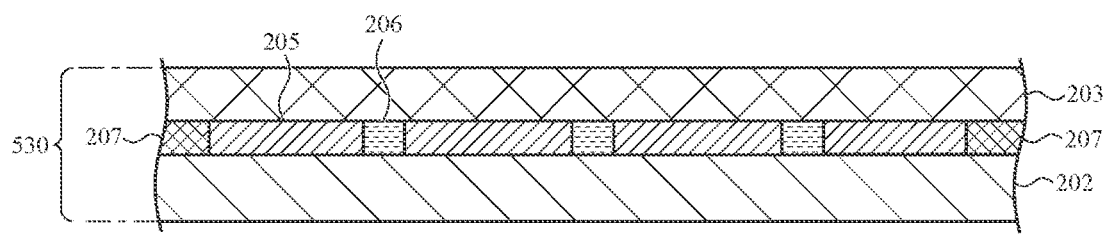
FIG. 7E depicts a ninth example operation in laminating components of a touch device stack to assemble the touch device stack of the trackpad of FIG. 3 where the touch-sensing layer component and the cover layer component are brought proximate.

As illustrated in FIG. 7D, the room-temperature-activated liquid adhesive 205 that will become the bonding component is activated using UV light. The UV light 511 is directed on the room-temperature-activated liquid adhesive 205 that will become the bonding component by the UV light source 510 to activate the room-temperature-activated liquid adhesive 205. As illustrated in FIG. 7E, the intermediate component of FIG. 6D including the touch-sensing layer component 203 and the cover layer component 202 are brought proximate so the room-temperature-activated liquid adhesive 205 that will become the bonding component enters an area defined around the adhesive-spacing component and the adhesive-alignment-holding component. Thus, a first stack 530 is formed.

Figure 7F:
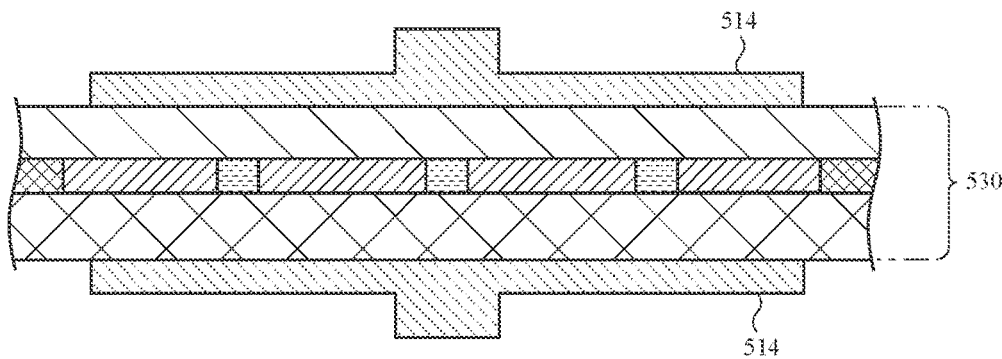
FIG. 7F depicts a tenth example operation in laminating components of a touch device stack to assemble the touch device stack of the trackpad of FIG. 3 where the room-temperature-activated liquid adhesive that will become the bonding component is cured while clamped using a clamp mechanism.

As illustrated in FIG. 7F, the bonding component is cured while the first stack 530 is clamped using a clamp mechanism 514. The clamp mechanism 514 is subsequently removed from the first stack 530 to allow the bonding component to free cure.

Figure 8A:
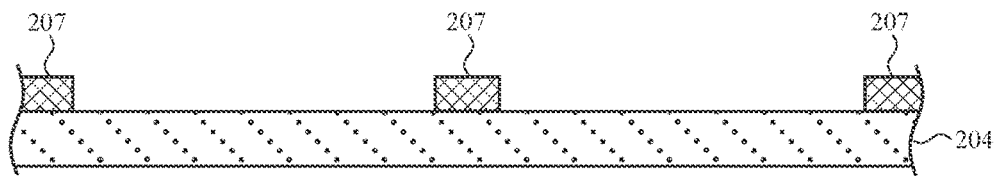
FIG. 8A depicts an eleventh example operation in laminating components of a touch device stack to assemble the touch device stack of the trackpad of FIG. 3 where an additional adhesive-spacing component/additional adhesive-alignment-holding component is bonded to the stiffener layer component.
Figure 8B:
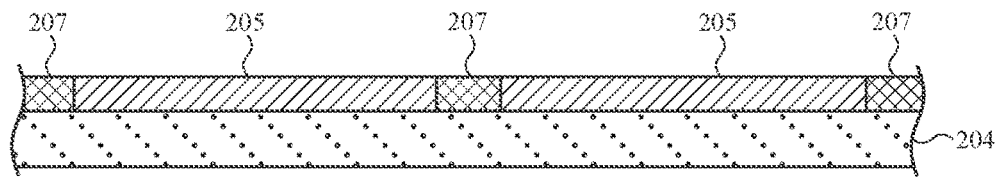
FIG. 8B depicts a twelfth example operation in laminating components of a touch device stack to assemble the touch device stack of the trackpad of FIG. 3 where room-temperature-activated liquid adhesive that will become an additional bonding component is applied to the stiffener layer component in an area defined around the additional adhesive-spacing component/additional adhesive-alignment-holding component.

As illustrated in FIG. 8A, an additional adhesive-spacing component/additional adhesive-alignment-holding component, PSA 207, is bonded to the stiffener layer component 204. As shown, the PSA 207 is bonded to the stiffener layer component 204 to define an area into which the room-temperature-activated liquid adhesive 205 that will become the additional bonding component will be applied. As illustrated in FIG. 8B, room-temperature-activated liquid adhesive 205 that will become an additional bonding component is applied to the stiffener layer component 204 in an area defined around the adhesive-spacing component/additional adhesive-alignment-holding component that is the PSA 207.

Figure 8C:
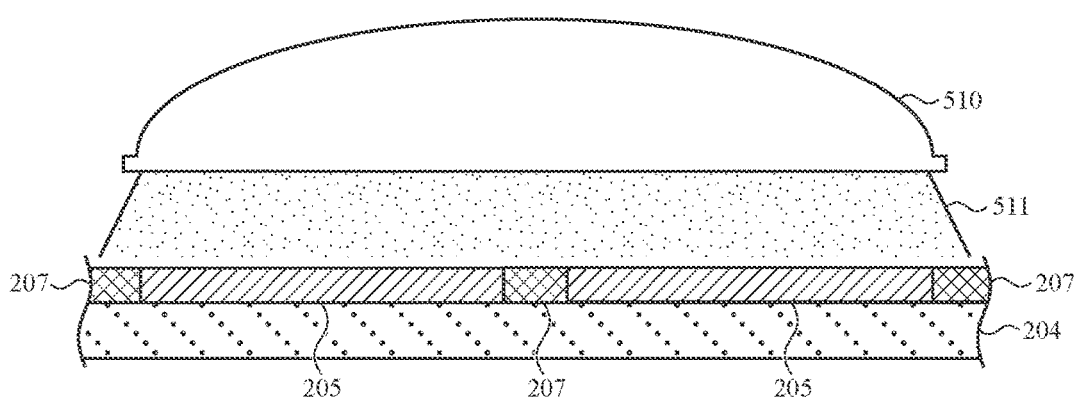
FIG. 8C depicts a thirteenth example operation in laminating components of a touch device stack to assemble the touch device stack of the trackpad of FIG. 3 where the room-temperature-activated liquid adhesive that will become the additional bonding component is activated using UV light.
Figure 8D:
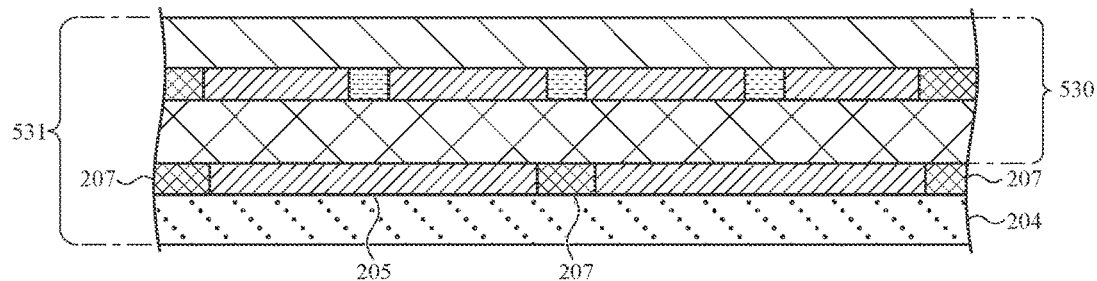
FIG. 8D depicts a fourteenth example operation in laminating components of a touch device stack to assemble the touch device stack of the trackpad of FIG. 3 where the stiffener layer component and the cover layer component are brought into proximity.

As illustrated in FIG. 8C, the room-temperature-activated liquid adhesive 205 that will become the additional bonding component is activated using UV light 511. The UV light 511 is directed on the room-temperature-activated liquid adhesive 205 that will become the additional bonding component by the UV light source 510 to activate the room-temperature-activated liquid adhesive 205. As illustrated in FIG. 8D, the stiffener layer component 204 and the first stack 530 are brought into proximity to form a second stack 531.

Figure 8E:
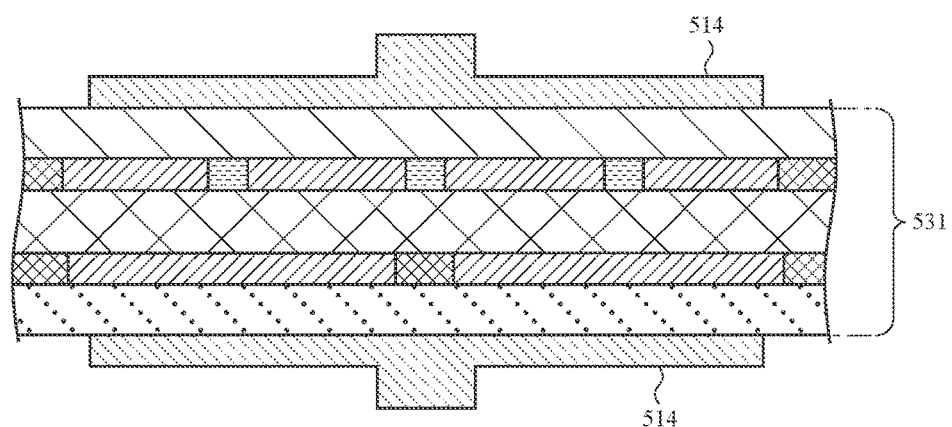
FIG. 8E depicts a fifteenth example operation in laminating components of a touch device stack to assemble the touch device stack of the trackpad of FIG. 3 where the room-temperature-activated liquid adhesive that will become the additional bonding component is cured while clamped using a clamp mechanism.

As illustrated in FIG. 8E, the additional bonding component is cured while the second stack 531 is clamped using a clamp mechanism 514. The clamp mechanism 514 is subsequently removed from the second stack 531 to allow the additional bonding component to free cure.

Figure 9:
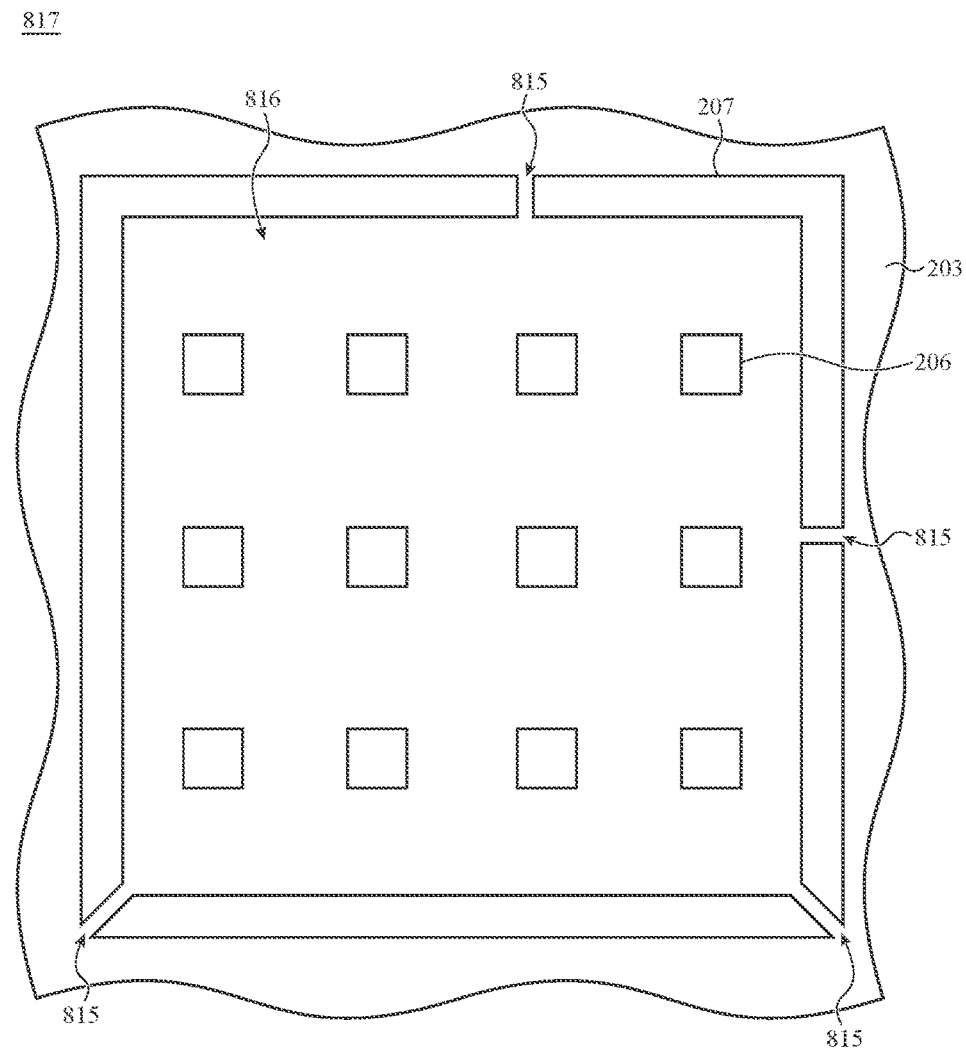
FIG. 9 illustrates a top view of the intermediate component of the touch device stack of the fourth example operation illustrated in FIG. 6D that is used to assemble the touch device stack of the trackpad of FIG. 3.

FIG. 9 illustrates a top view of the intermediate component of the touch device stack of the fourth example operation illustrated in FIG. 6D that is used to assemble the touch device stack 231 of the trackpad 101 of FIG. 3. The PSA 207 on the touch-sensing layer component 203 or substrate forms a perimeter around the cured columns of room-temperature-activated liquid adhesive 206. The PSA 207 also defines an area 816 around the cured columns of room-temperature-activated liquid adhesive 206 where a room-temperature-activated liquid adhesive that will become the bonding component will be applied. Accordingly, in some embodiments a single bonding component may fill (or substantially fill) the area 816 and surround some or all of the cured spacing components 206. A number of gaps 815 are defined in the PSA 207 between the area 816 and an external environment 817. These may be configured to allow air, gas, bubbles, and so on to pass without allowing passage of the room-temperature-activated liquid adhesive. As such, air, gas, bubbles, and so on may escape from the room-temperature-activated liquid adhesive through the gaps 815 during curing of the room-temperature-activated liquid adhesive.

Figure 10:
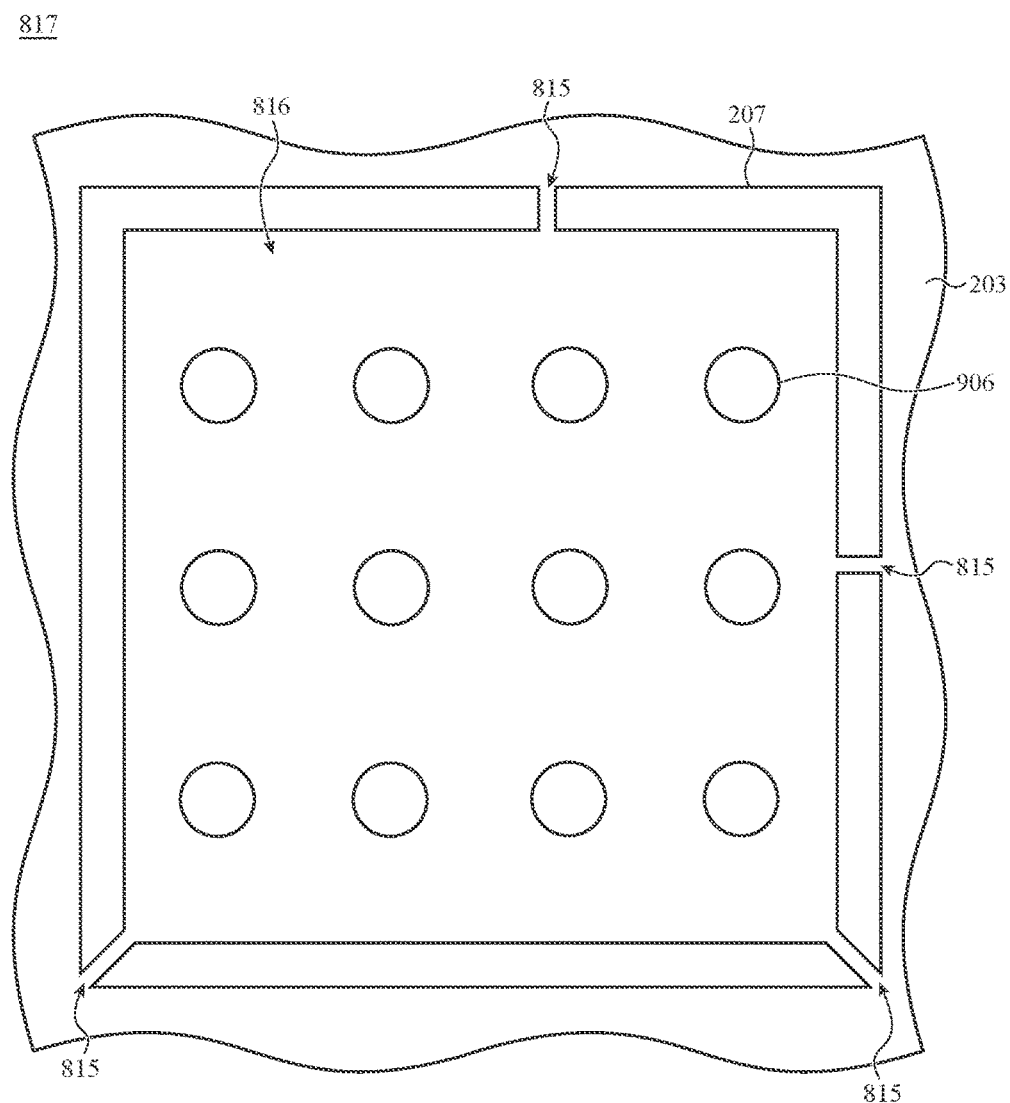
FIG. 10 illustrates a first additional example of the intermediate component of the touch device stack of FIG. 9 in accordance with further embodiments.

FIG. 10 illustrates a first additional example of the intermediate component of the touch device stack of FIG. 9 in accordance with further embodiments. As compared with the intermediate component of FIG. 9, the adhesive-spacing component of the intermediate component of FIG. 10 is cured beads of room-temperature-activated liquid adhesive 906. In some implementations, the cured beads of room-temperature-activated liquid adhesive 906 may be applied as liquid and cured on the touch-sensing layer component 203. In other implementations, the cured beads of room-temperature-activated liquid adhesive 906 may be cured before being disposed on the touch-sensing layer component 203 or substrate.

Figure 11A:
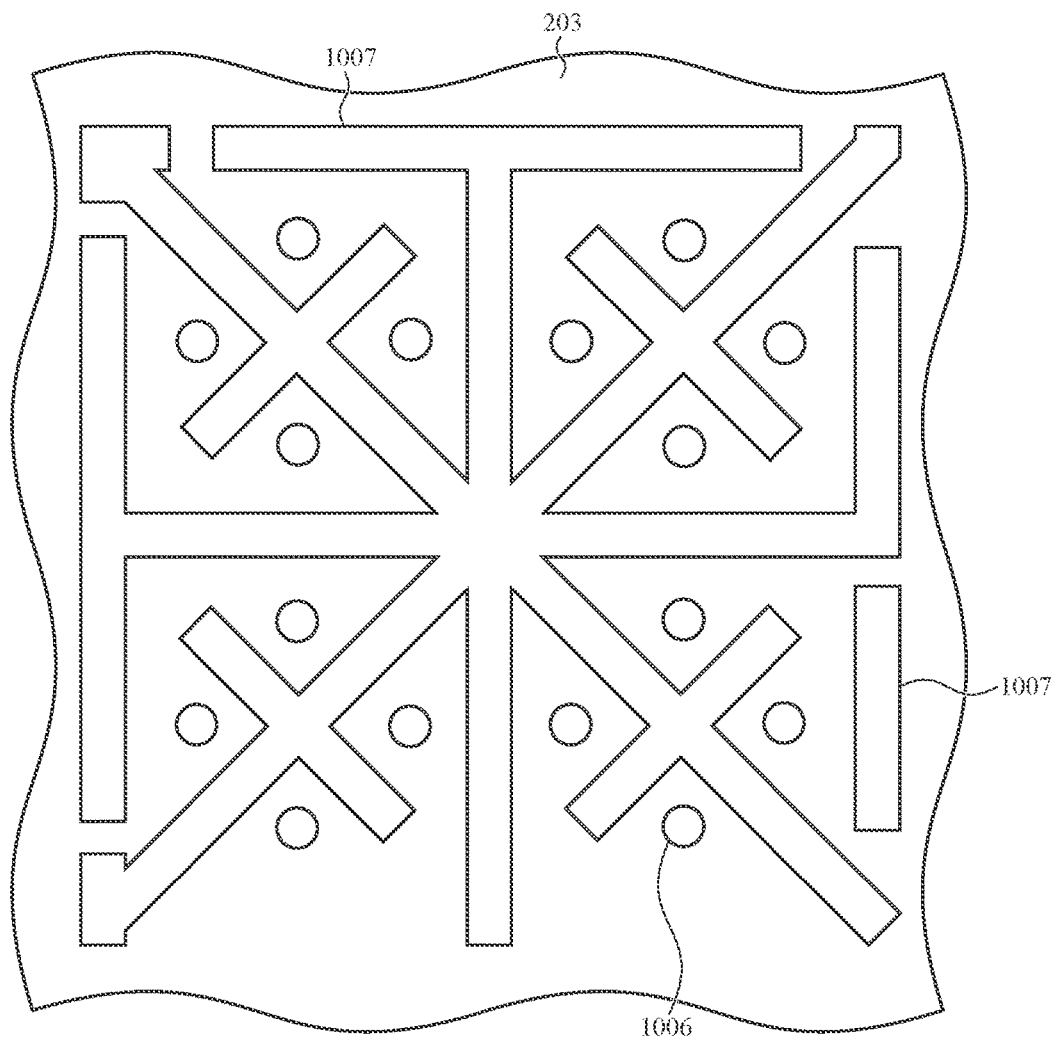
FIG. 11A illustrates a second additional example of the intermediate component of the touch device stack of FIG. 9 in accordance with further embodiments.

FIG. 11A illustrates a second additional example of the intermediate component of the touch device stack of FIG. 9 in accordance with further embodiments. As compared with the intermediate component of FIG. 7, the PSA 1007 that is the adhesive-alignment-holding component of the intermediate component of FIG. 11A is arranged in a shaped configuration in various areas around various cured beads of the room-temperature-activated liquid adhesive 1006 that form part of the adhesive-spacing component of the intermediate component of FIG. 11A rather than forming a basic perimeter. As such, the PSA 1007 functions in combination with the cured beads of the room-temperature-activated liquid adhesive 1006 as the adhesive-spacing component of the intermediate component of FIG. 11A.

Figure 11B:
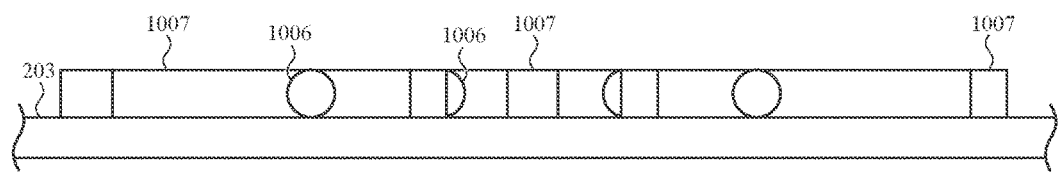
FIG. 11B illustrates a side view of the second additional example of the intermediate component of the touch device stack of FIG. 11A.

FIG. 11B illustrates a side view of the second additional example of the intermediate component of the touch device stack of FIG. 11A. The roundness of the cured beads of the room-temperature-activated liquid adhesive 1006 is visible from this side view.

Figure 12:
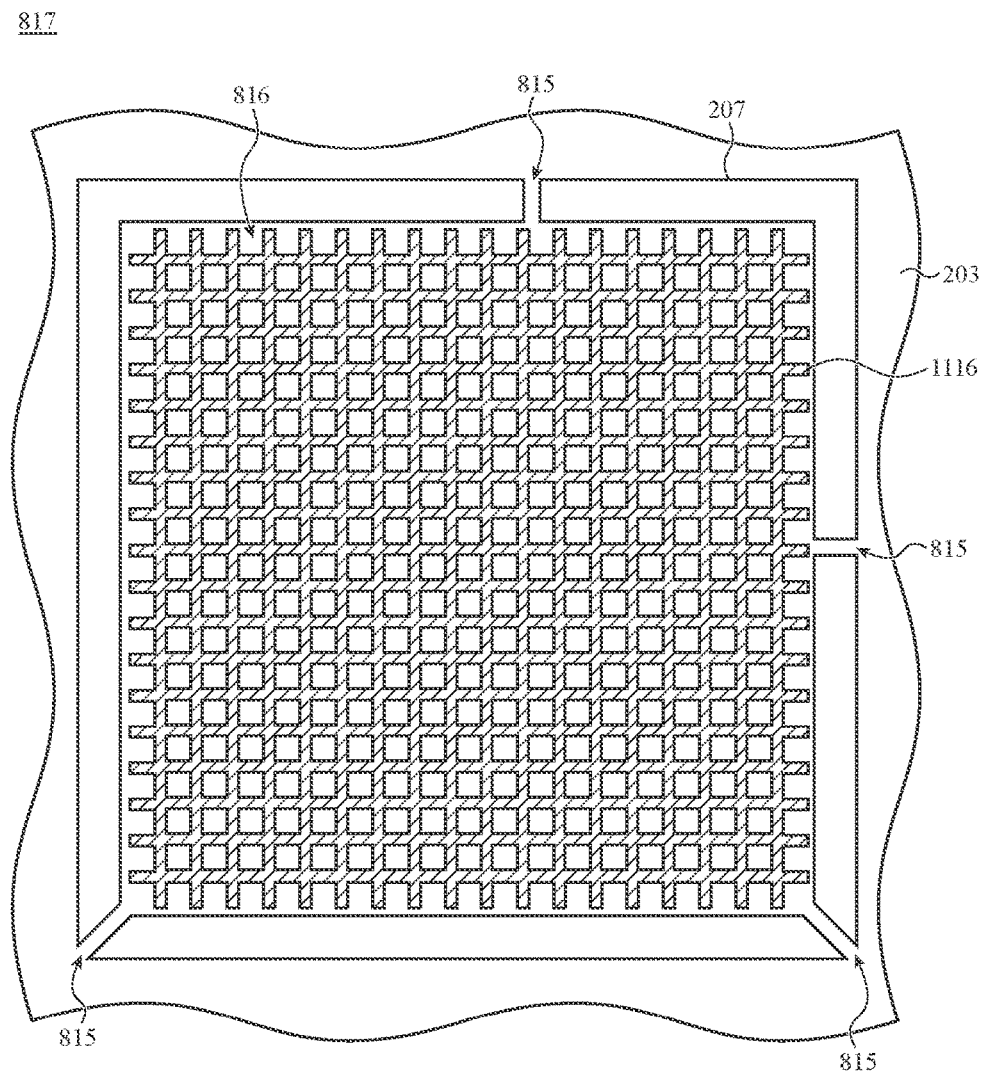
FIG. 12 illustrates a third additional example of the intermediate component of the touch device stack of FIG. 9 in accordance with further embodiments.

FIG. 12 illustrates a third additional example of the intermediate component of the touch device stack of FIG. 9 in accordance with further embodiments. As compared with the intermediate component of FIG. 9, the adhesive-spacing component of the intermediate component of FIG. 12 is a mesh 1116. This mesh 1116 defines apertures that are fillable with an array of bonding components, such as a room-temperature-activated liquid adhesive, and is operable to maintain space between the touch-sensing layer component 203 or substrate and the component layer to which the touch-sensing layer component 203 is coupled while the bonding component cures.

Figure 13:
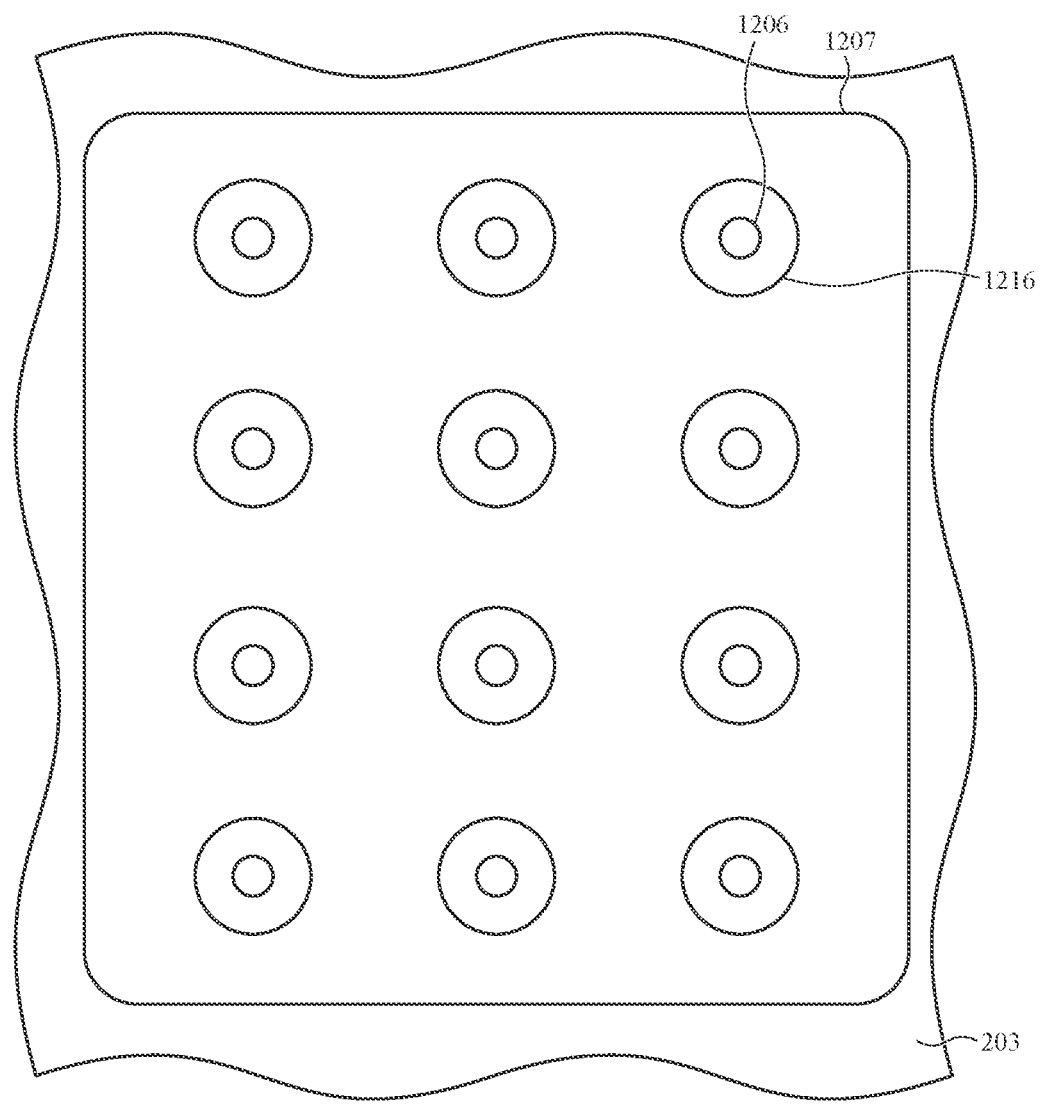
FIG. 13 illustrates a fourth additional example of the intermediate component of the touch device stack of FIG. 9 in accordance with further embodiments.

FIG. 13 illustrates a fourth additional example of the intermediate component of the touch device stack of FIG. 13 in accordance with further embodiments. As compared with the intermediate component of FIG. 10, the PSA 1207 that is the adhesive-alignment-holding component of the intermediate component of FIG. 13 is a sheet having individual apertures defining areas 1216 in which cured beads of the room-temperature-activated liquid adhesive 1206 that form part of the adhesive-spacing component of the intermediate component of FIG. 13 rather than defining a single large area in which cured room-temperature-activated liquid adhesive is disposed. As such, the PSA 1207 functions in combination with the cured beads of the room-temperature-activated liquid adhesive 1206 as the adhesive-spacing component of the intermediate component of FIG. 13.

FIGS. 13A-15E illustrate example operations in laminating components of different implementations of a touch device stack than the touch device stack of the touch device stack 231 of the trackpad 101 of FIG. 3. As compared to the operations illustrated in FIGS. 5A-7E, the operations depicted in FIGS. 13A-15E may eliminate or reduce cleaning of various adhesives or other materials from fixtures used in assembly and/or the touch device stack.

Figure 14A:
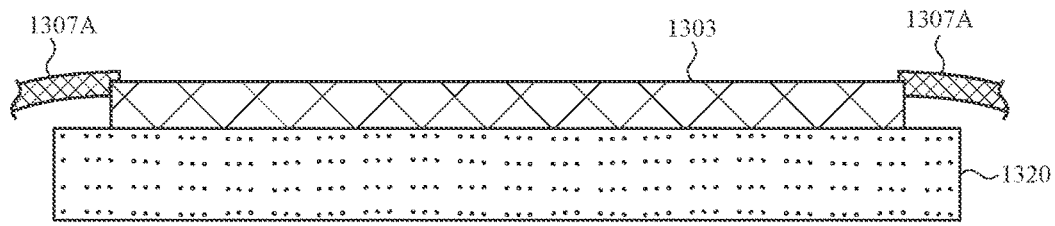
FIG. 14A depicts a first example operation in laminating components of a touch device stack to assemble a different implementation of a touch device stack than the touch device stack of the trackpad of FIG. 3 where first pressure sensitive adhesive (PSA) wings of the adhesive-alignment-holding component are bonded to a touch-sensing layer component.
Figure 14B:
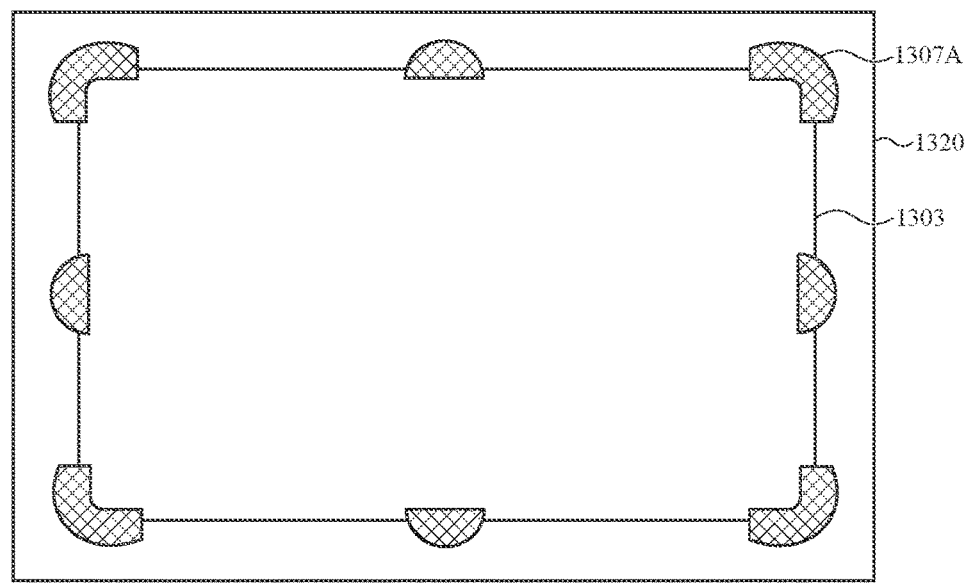
FIG. 14B depicts a top-down view of the touch-sensing layer component after lamination of the first PSA wings.

In 13A, first PSA wings 1307A are bonded to a touch-sensing layer component 1303 or substrate. The touch-sensing layer component 1303 may be supported by a support structure 1320. The first PSA wings 1307A form a portion of the adhesive-alignment-holding component. FIG. 14B depicts a top-down view of the touch-sensing layer component 1303 after lamination of the first PSA wings 1307A.

The first PSA wings 1307A may be a film and include a thinner portion where they are bonded to the touch-sensing layer component 1303 and a thicker portion where they are not bonded to the touch-sensing layer component 1303. The thinner portion may be bonded to the touch-sensing layer component 1303 with a low-strength bond and/or other low adhesion bond line. This allows for the thinner portion of the first PSA wings 1307A that will be positioned between the touch-sensing layer component 1303 and the cover layer component 1302, as discussed in more detail below, to be as thin as possible so as to be easily detachable from the touch-sensing layer component 1303 while the thicker portion can be thicker so as to be rigid enough to be pulled upon and/or otherwise manipulated without breaking. The thinner portion may also serve to maximize the volume available between the first PSA wings 1307A and the second PSA wings 1307B discussed below to contain the room-temperature-activated liquid adhesive 1305A, 1305B discussed below.

Figure 14C:
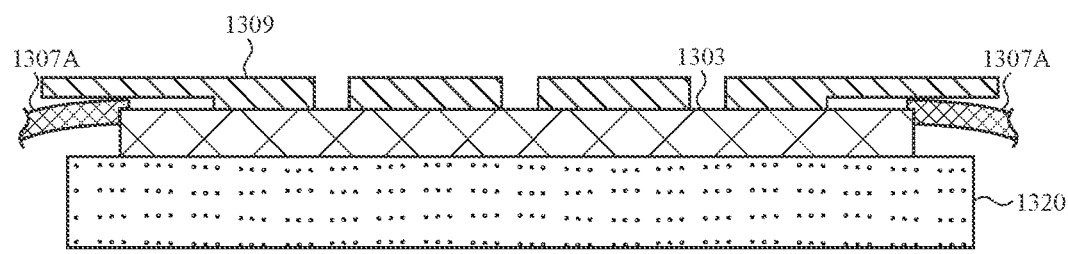
FIG. 14C depicts a second example operation in laminating components of a touch device stack where a first stencil is placed on the touch-sensing layer component.
Figure 14D:
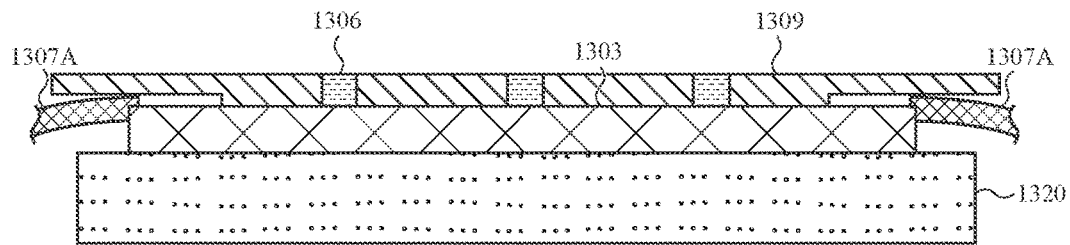
FIG. 14D depicts a third example operation in laminating components of a touch device stack where room-temperature-activated liquid adhesive that will become the adhesive-spacing component is stencil printed onto the touch-sensing layer component through holes in the first stencil.
Figure 14E:
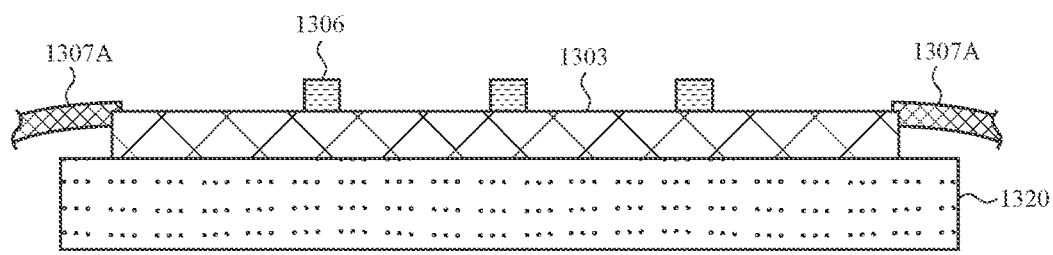
FIG. 14E depicts a fourth example operation in laminating components of a touch device stack where the first stencil is removed.
Figure 14F:
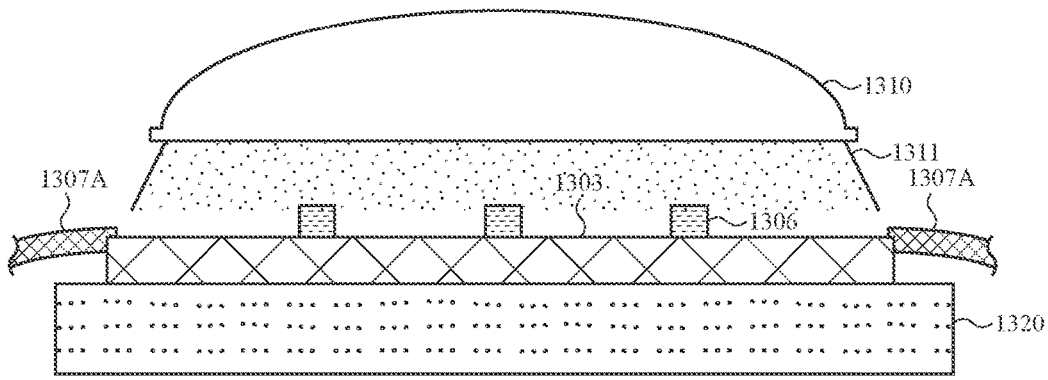
FIG. 14F depicts a fifth example operation in laminating components of a touch device stack where the room-temperature-activated liquid adhesive that will become the adhesive-spacing component is cured using UV light.

A first stencil 1309 is then placed on the touch-sensing layer component 1303, as shown in FIG. 14C. As shown in FIG. 14D, room-temperature-activated liquid adhesive 1306 that will become the adhesive-spacing component is stencil printed (or screen printed) onto the touch-sensing layer component 1303 through holes in the first stencil 1309. The first stencil 1309 is then removed, as shown in FIG. 14E, before the room-temperature-activated liquid adhesive 1306 that will become the adhesive-spacing component is cured using UV light 1311 from a UV light source 1310, as shown in FIG. 14F.

Figure 14G:
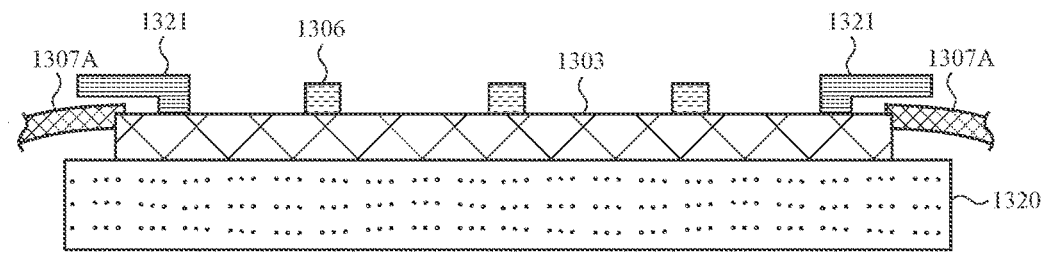
FIG. 14G depicts a sixth example operation in laminating components of a touch device stack where a second stencil is placed on the touch-sensing layer component.
Figure 14H:
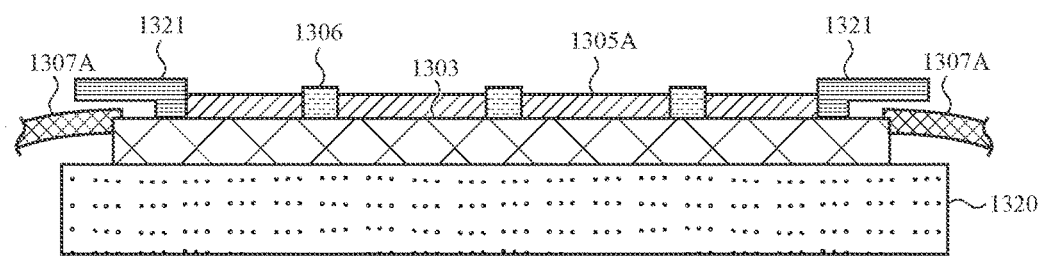
FIG. 14H depicts a seventh example operation in laminating components of a touch device stack where room-temperature-activated liquid adhesive that will become a portion of the bonding component is stencil printed onto the touch-sensing layer component through a hole in the second stencil.
Figure 14I:
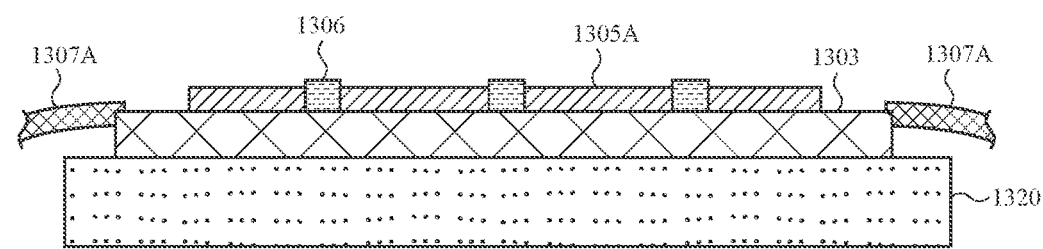
FIG. 14I depicts an eighth example operation in laminating components of a touch device stack where the second stencil is removed.

As shown in FIG. 14G, a second stencil 1321 is then placed on the touch-sensing layer component 1303. As shown in FIG. 14H, room-temperature-activated liquid adhesive 1305A that will become a portion of the bonding component is large area stencil printed (or screen printed) onto the touch-sensing layer component 1303 through a hole in the second stencil 1321. The second stencil 1321 is then removed, as shown in FIG. 14I.

Figure 14J:
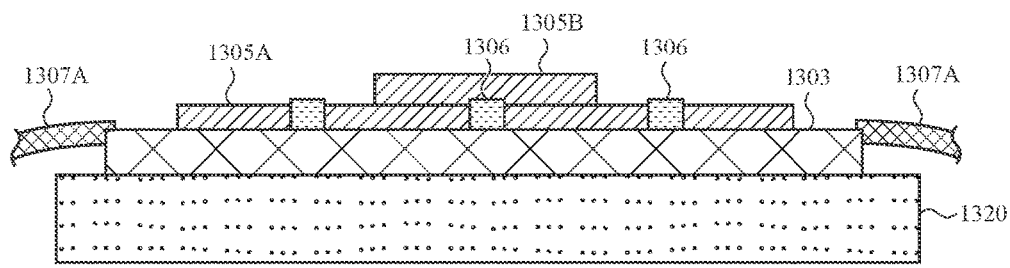
FIG. 14J depicts a ninth example operation in laminating components of a touch device stack where additional room-temperature-activated liquid adhesive that will become an additional portion of the bonding component is applied to the adhesive-spacing component and the previously applied portion of the bonding component.

Additional room-temperature-activated liquid adhesive 1305B that will become an additional portion of the bonding component is applied. As shown in FIG. 14J, the additional room-temperature-activated liquid adhesive 1305B is applied to the adhesive-spacing component formed by the columns of cured room-temperature-activated liquid adhesive 1306 and the previously applied portion of the bonding component formed by the room-temperature-activated liquid adhesive 1305A.

The additional room-temperature-activated liquid adhesive 1305B may form a hump or other structure that contacts a center portion of the cover layer component 1302 first to expel air outwards from the center via progressive radial outward wetting contact. The additional room-temperature-activated liquid adhesive 1305B may also compensate for variations in components such as the touch-sensing layer component 1303 to the cover layer component 1302, such as surface inconsistencies that could result in bubbles, voids, or air gaps if there is not a sufficient amount of adhesive to fill those inconsistencies.

For example, if the cover layer component 1302 is bowed and the room-temperature-activated liquid adhesive 1305A is flat, bubbles, gaps, or other voids could be formed between the cover layer component 1302 and the touch-sensing layer component 1303 where the higher portion of the cover layer component 1302 does not contact the room-temperature-activated liquid adhesive 1305A. This could result in dielectric variances, as gas and the room-temperature-activated liquid adhesive 1305A would not have the same dielectric. However, placement of the additional room-temperature-activated liquid adhesive 1305B approximately in the middle of the area filled by the room-temperature-activated liquid adhesive 1305A ensures that the middle of the cover layer component 1302 will contact the middle portion of the additional room-temperature-activated liquid adhesive 1305B regardless of any bowing or other shape variations of the cover layer component 1302.

Further, the thickness of the room-temperature-activated liquid adhesive 1305A, 1305B may affect activation and/or curing, thicker areas retaining more heat that advances activation and/or curing and thinner areas retaining less heat. Areas that are too thick may activate and/or cure too quickly and areas that are too thin may allow activation and/or curing to cease early.

Figure 14K:
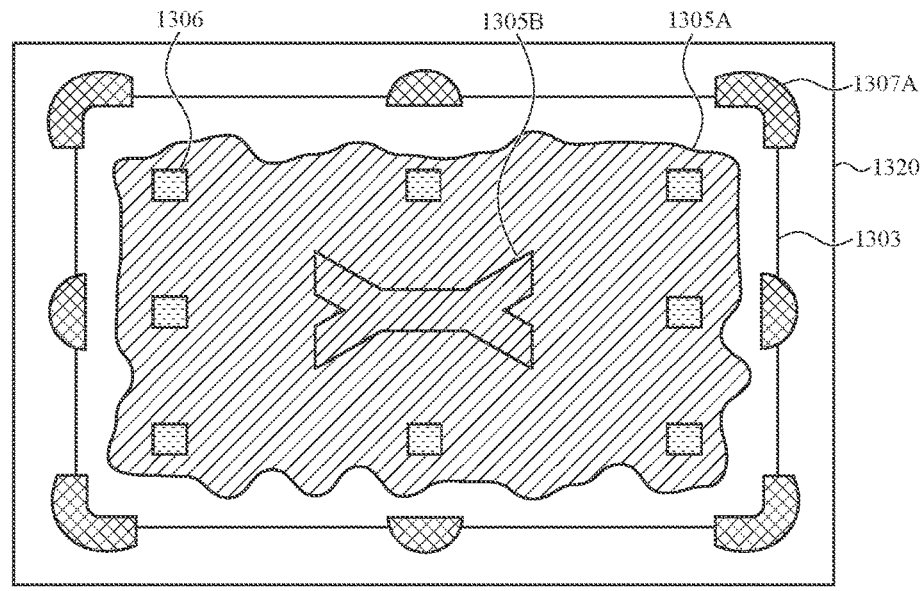
FIG. 14K depicts a top view of the ninth example operation of FIG. 14J, illustrating the arrangement of the additional room-temperature-activated liquid adhesive.

FIG. 14K depicts a top view of the ninth example operation of FIG. 14J, illustrating the arrangement of the additional room-temperature-activated liquid adhesive 1305B. The additional room-temperature-activated liquid adhesive 1305B is configured in a "dog bone" shaped arrangement. As discussed in more detail below, this arrangement may relate to activation and/or curing of the room-temperature-activated liquid adhesive 1305A, 1305B, how the room-temperature-activated liquid adhesive 1305A, 1305B will move once the touch-sensing layer component 1303 is brought into proximity with the cover layer component 1302, and so on.

Figure 14L:
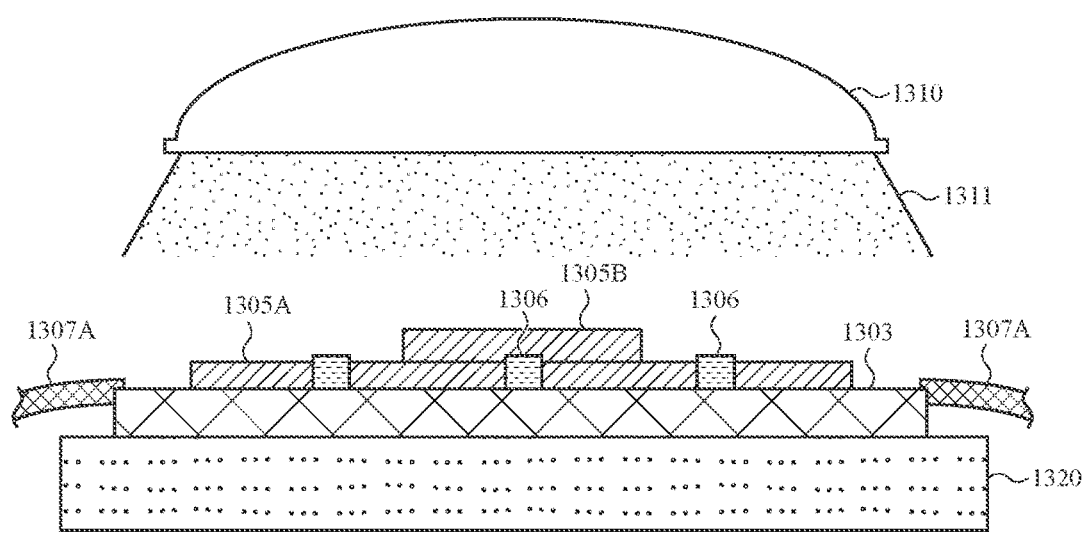
FIG. 14L depicts a tenth example operation in laminating components of a touch device stack where the room-temperature-activated liquid adhesive that will become the adhesive-spacing component is activated using UV light.

The room-temperature-activated liquid adhesive 1305A, 1305B is then activated using UV light 1311 from the UV light source 1310. This is shown in FIG. 14L. The room-temperature-activated liquid adhesive 1305A, 1305B may be sufficiently activated that the room-temperature-activated liquid adhesive 1305A, 1305B will bond to the cover layer component 1302 once brought into contact therewith, as discussed below, but not activated to the point that the room-temperature-activated liquid adhesive 1305A, 1305B cures before brought into contact with the cover layer component 1302. Joining the cover layer component 1302 and the touch-sensing layer component 1303 before the end of the "open time" of the room-temperature-activated liquid adhesive 1305A, 1305B may ensure good adhesion between the cover layer component 1302 and the touch-sensing layer component 1303.

Figure 15A:
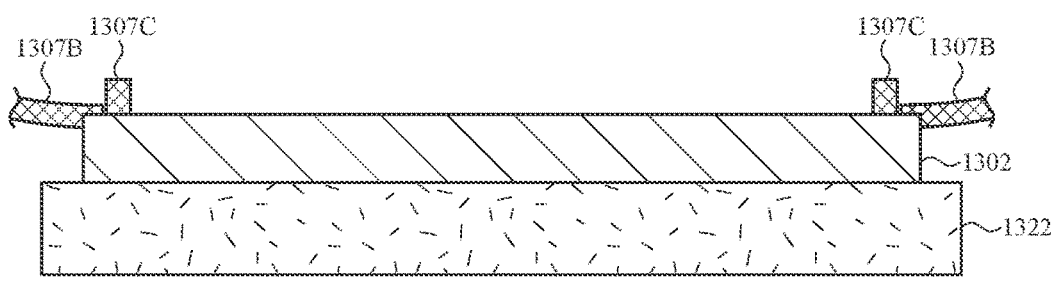
FIG. 15A depicts an eleventh example operation in laminating components of a touch device stack where second PSA wings of the adhesive-alignment-holding component and PSA of the adhesive-alignment-holding component are bonded to a cover layer component.
Figure 15B:
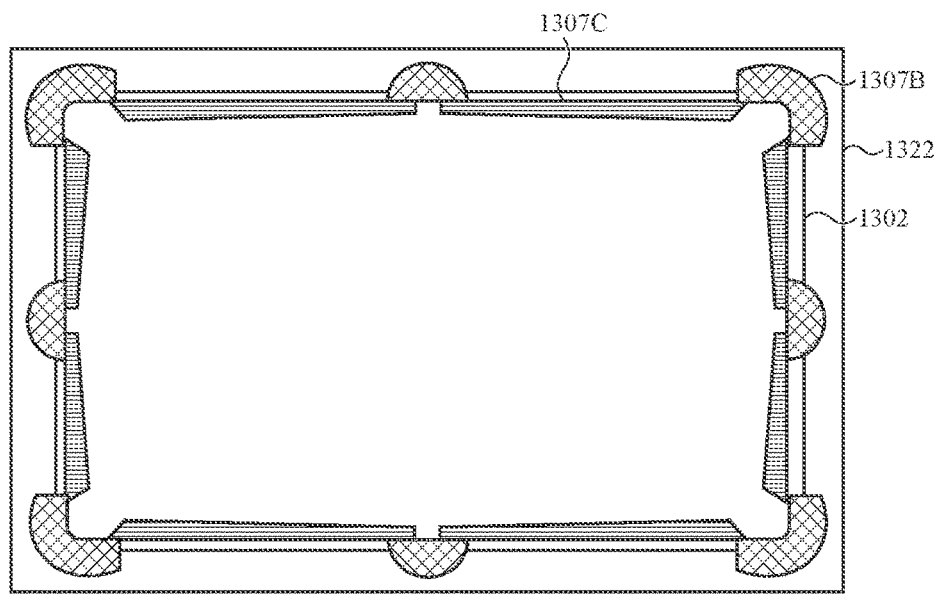
FIG. 15B depicts a top-down view of the cover layer component after lamination of the second PSA wings and the PSA.

FIG. 15A depicts lamination of second PSA wings 1307B of the adhesive-alignment-holding component to a cover layer component 1302 or substrate. PSA adhesive dam 1307C of the adhesive-alignment-holding component is also bonded to the cover layer component 1302. The cover layer component 1302 may be supported by a support structure 1322. FIG. 15B depicts a top-down view of the cover layer component 1302 after lamination of the second PSA wings 1307B and the PSA adhesive dam 1307C.

Similar to the first PSA wings 1307A, the second PSA wings 1307B may be a film and include a thinner portion where they are bonded to the cover layer component 1302 and a thicker portion where they are not bonded to the cover layer component 1302. The thinner portion may be bonded to the cover layer component 1302 with a low-strength bond. This allows for the thinner portion of the second PSA wings 1307B that will be positioned between the cover layer component 1302 and the touch-sensing layer component 1303, as discussed in more detail below, to be as thin as possible so as to be easily detachable from the cover layer component 1302 while the thicker portion can be thicker so as to be stiff enough to be pulled upon and/or otherwise manipulated without breaking.

Figure 16A:
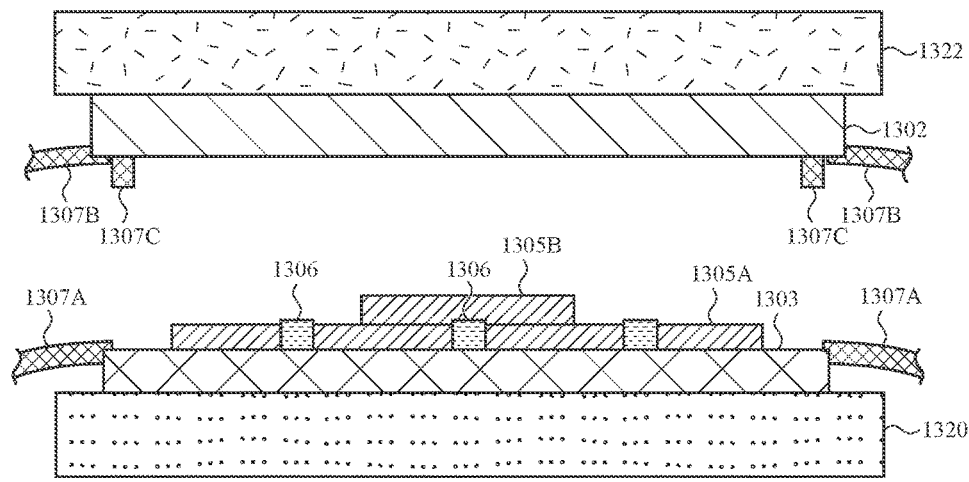
FIG. 16A depicts a twelfth example operation in laminating components of a touch device stack where the touch-sensing layer component and the cover layer component are aligned.
Figure 16B:
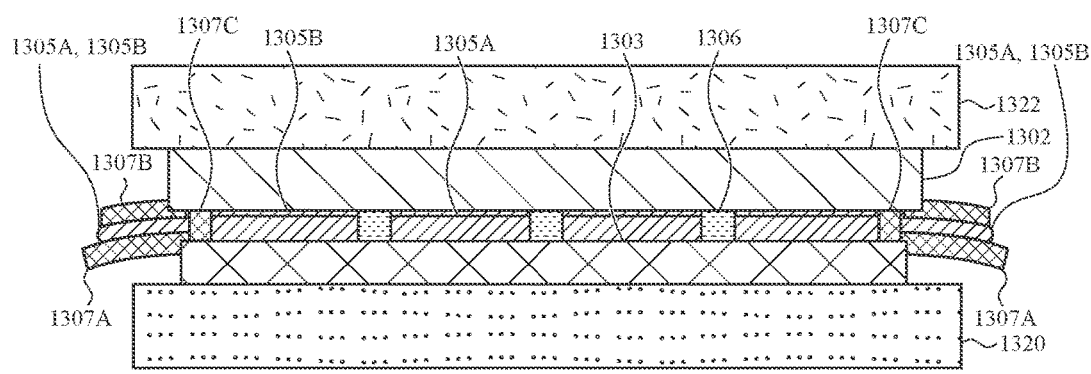
FIG. 16B depicts a thirteenth example operation in laminating components of a touch device stack where the touch-sensing layer component and the cover layer component are brought together such that the additional room-temperature-activated liquid adhesive is squeezed into gaps between the touch-sensing layer component and the cover layer component and between the first and second PSA wings.

As shown in FIGS. 16A and 16B, the touch-sensing layer component 1303 (e.g., the assembly including the touch-sensing layer component 1303 shown in FIG. 14J) and the cover layer component 1302 (e.g., the assembly including the cover layer component 1302 shown in FIG. 15A) are aligned and brought into proximity with each other. Bringing the touch-sensing layer component 1303 and the cover layer component 1302 together causes the PSA adhesive dam 1307C to contact the touch-sensing layer component 1303.

Further, as the touch-sensing layer component 1303 and the cover layer component 1302 are brought together, the room-temperature-activated liquid adhesive 1305A, 1305B is squeezed. This pressure on the room-temperature-activated liquid adhesive 1305A, 1305B forces the room-temperature-activated liquid adhesive 1305A, 1305B into gaps between the touch-sensing layer component 1303 and the cover layer component 1302. This pressure also forces the room-temperature-activated liquid adhesive 1305A, 1305B into gaps between the first and second PSA wings 1307A, 1307B. The spacing between the first and second PSA wings 1307A, 1307B, which may be microns apart, may also pull the room-temperature-activated liquid adhesive 1305A, 1305B in by capillary action. The thinner portion of the first and second PSA wings 1307A, 1307B may serve to maximize the volume available between the first and second PSA wings 1307A, 1307B to contain the room-temperature-activated liquid adhesive 1305A, 1305B.

Figure 16C:
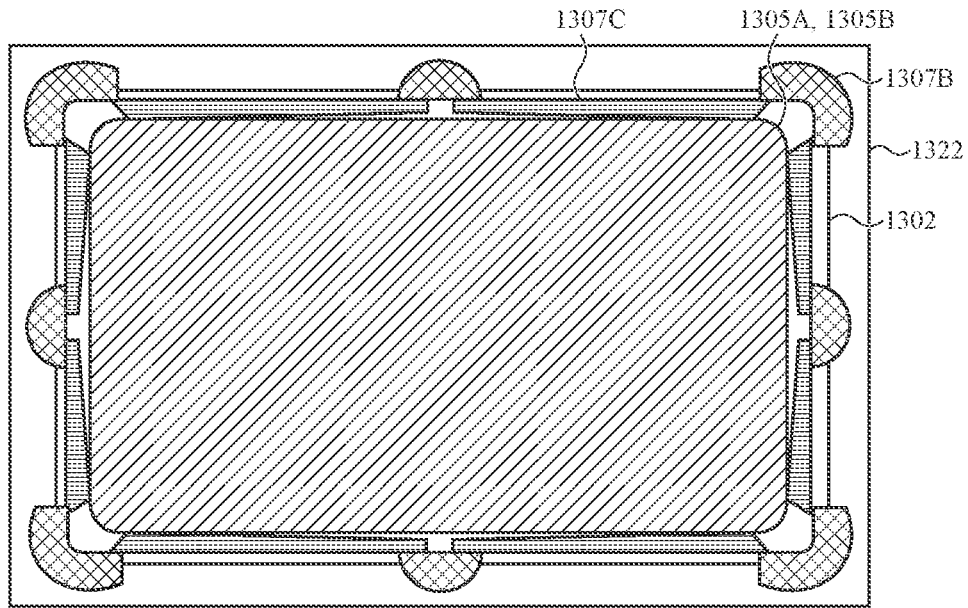
FIG. 16C depicts a bottom view of the assembly including the cover layer component of FIG. 16A as the assembly including the touch-sensing layer component and the assembly including the cover layer component are brought together, with the assembly including the touch-sensing layer component removed for clarity.
Figure 16D:
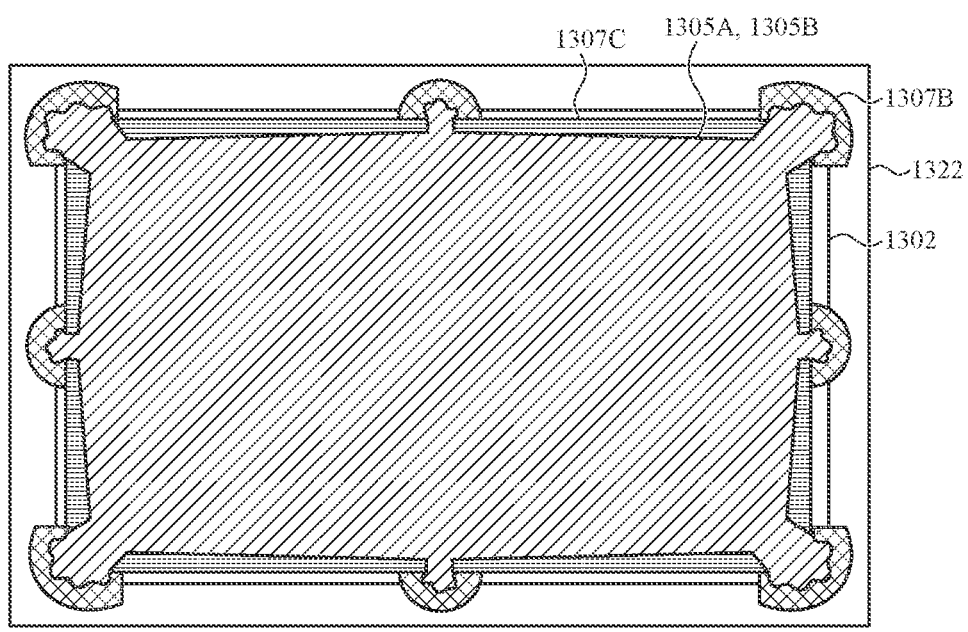
FIG. 16D depicts the assembly of FIG. 16C as the touch-sensing layer component and the assembly including the cover layer component move from the configuration shown in FIG. 16A to that shown in FIG. 16B.

FIG. 16C is a bottom view of the assembly including the cover layer component 1302 of FIG. 16A as the assembly including the touch-sensing layer component 1303 and the assembly including the cover layer component 1302 are brought together, with the assembly including the touch-sensing layer component removed for clarity. As the room-temperature-activated liquid adhesives 1305A, 1305B are pressed between the touch-sensing layer component 1303 and the cover layer component 1302, the room-temperature-activated liquid adhesives 1305A, 1305B move toward the PSA adhesive dam 1307C. The dimensions of the PSA adhesive dam 1307C are angled to be "constantly diverging." In other words, as illustrated, the PSA adhesive dam 1307C is angled toward openings such that the moving room-temperature-activated liquid adhesives 1305A, 1305B will reach further projecting portions first and then continue flowing along the angled portion of the PSA adhesive dam 1307C toward the opening, as shown in FIG. 16D. Thus, as the touch-sensing layer component 1303 and the cover layer component 1302 move from FIG. 16A to FIG. 16B, the room-temperature-activated liquid adhesives 1305A, 1305B are pressed and flow until a portion is forced through the openings and into the gaps between the first and second PSA wings 1307A, 1307B. In this way, the PSA adhesive dam 1307C may be shaped to function as a funnel.

As described above, the additional room-temperature-activated liquid adhesive 1305B may be configured in the "dog bone" or similar shaped arrangement. This may dispose the additional room-temperature-activated liquid adhesive 1305B in areas that correspond to closer portions of the PSA adhesive dam 1307C to guide flow of the room-temperature-activated liquid adhesives 1305A, 1305B towards closer portions of the PSA adhesive dam 1307C, along the angled surface of the PSA adhesive dam 1307C toward the further away portions, and out the openings into the gaps between the first and second PSA wings 1307A, 1307B. As such, the shape and placement of the additional room-temperature-activated liquid adhesive 1305B may guide flow of the room-temperature-activated liquid adhesives 1305A, 1305B. Although a dog bone configuration is discussed, in various implementations, one or more various adhesives may be dispensed in any geometry to optimize adhesive flow and minimize air trapping. For example, in some implementations, dots and/or lines of adhesive may be dispensed at locations prone to trap air bubbles in addition to a center dog bone pattern.

As such, the angling of the PSA adhesive dam 1307C prevents flow of the room-temperature-activated liquid adhesives 1305A, 1305B from catching gas against the PSA adhesive dam 1307C and forming bubbles, air, or other voids. The angling of the PSA adhesive dam 1307C may prevent formation of such bubbles, air, or other voids as gasses may be forced ahead of the room-temperature-activated liquid adhesives 1305A, 1305B out the openings in the PSA adhesive dam 1307C.

Figure 16E:
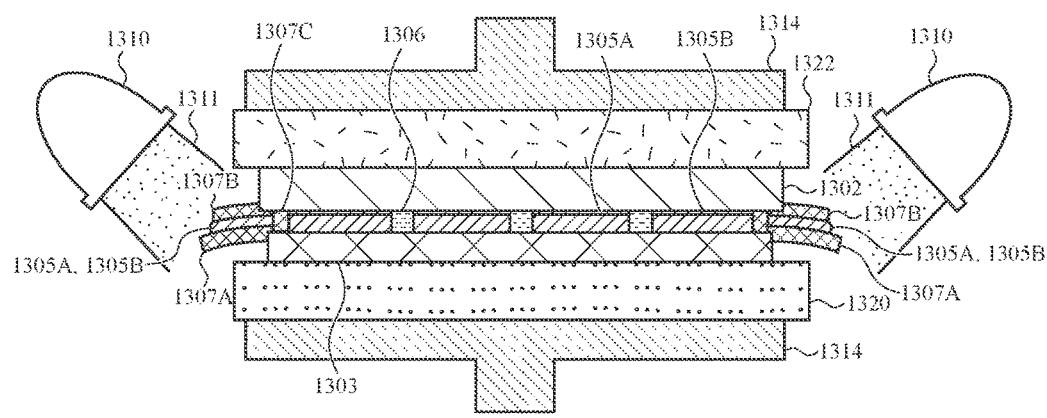
FIG. 16E depicts a fourteenth example operation in laminating components of a touch device stack where the room-temperature-activated liquid adhesive and the additional room-temperature-activated liquid adhesive that will become the bonding component are cured using UV light while clamped using a clamp mechanism.

The room-temperature-activated liquid adhesive 1305A, 1305B are then subjected to further accelerated cure using UV light 1311 produced by UV light sources 1310, as shown in FIG. 16E. Curing using UV or heat is optional. The room-temperature-activated liquid adhesive 1305A, 1305B may be partially as opposed to fully cured as the wings or other structures formed by the first PSA wings 1307A, the second PSA wings 1307B, and the partially cured room-temperature-activated liquid adhesive 1305A, 1305B may not be removable if the partially cured room-temperature-activated liquid adhesive 1305A, 1305B were fully cured. However, the partially cured room-temperature-activated liquid adhesive 1305A, 1305B could be too messy for the wings to be removed if the partially cured room-temperature-activated liquid adhesive 1305A, 1305B were not partially cured. Thus, partial curing may allow removal of the wings without excessive movement of the room-temperature-activated liquid adhesive 1305A, 1305B. In various implementations, the wings may be removed at a time when the room-temperature-activated liquid adhesive 1305A, 1305B is partially cured with sufficient rigidity and flexibility to detach without leaving "stringers" or voids.

Figure 16F:
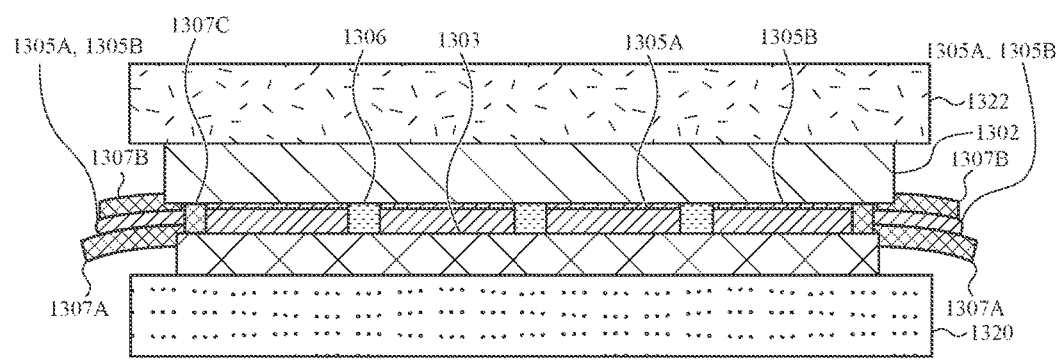
FIG. 16F depicts a fifteenth example operation in laminating components of a touch device stack where the UV light sources and the clamp mechanism are removed.

During the partial curing, the assembly including the touch-sensing layer component 1303 and the cover layer component 1302 is clamped using a clamp mechanism 1314. As shown in FIG. 16F, the UV light sources 1310 and the clamp mechanism 1314 are then removed.

Figure 16G:
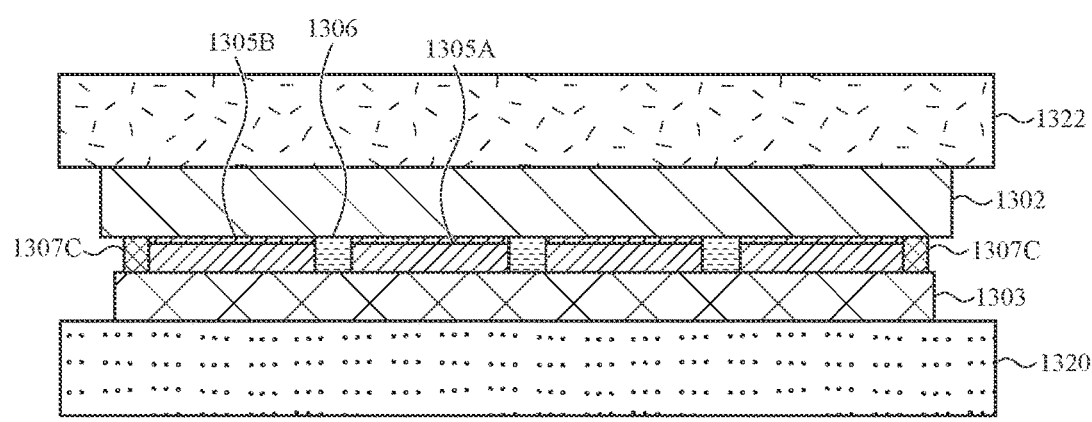
FIG. 16G depicts a sixteenth example operation in laminating components of a touch device stack where wings formed by the first PSA wings, the second PSA wings, and the cured room-temperature-activated liquid adhesive therebetween are removed.

As shown in FIG. 16G, wings or other structures formed by the first PSA wings 1307A, the second PSA wings 1307B, and the room-temperature-activated liquid adhesive 1305A, 1305B therebetween are removed. These wings that are removed may eliminate or reduce cleaning of various adhesives or other materials from fixtures used in assembly and/or the touch device stack. In particular, these wings that are removed may eliminate or reduce cleaning of various adhesives or other materials as compared to the operations depicted in FIGS. 5A-7F. The wings may perform this function by forming a "glue sandwich," capturing excess room-temperature-activated liquid adhesive 1305A, 1305B between the first PSA wings 1307A and the second PSA wings 1307B rather than allowing the excess room-temperature-activated liquid adhesive 1305A, 1305B to possibly contact fixtures used in assembly, components of the trackpad, and/or the touch device stack. This glue sandwich is removable by removing the wings. The partially cured room-temperature-activated liquid adhesive 1305A, 1305B may then be allowed to finish curing.

Thus, not only do the wings keep excess glue from other components and allow for easy removal, the wings may be evaluated to determine success of the lamination procedure. If some of the wings do not include any room-temperature-activated liquid adhesives 1305A, 1305B, insufficient room-temperature-activated liquid adhesives 1305A, 1305B may have been used and bubbles, gaps, and/or voids may have been formed. This may result in poorer bonding of the touch-sensing layer component 1303 and the cover layer component 1302, which may thus be detected by examining the wings.

Figure 18A:
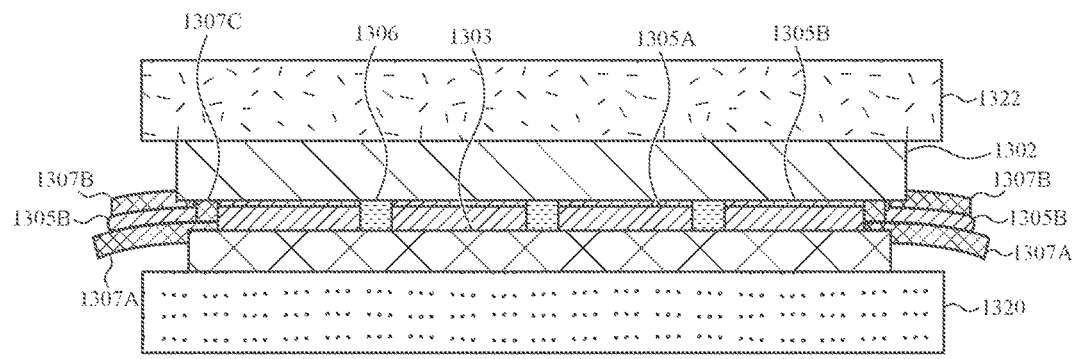
FIG. 18A depicts an alternative implementation of the touch device stack shown in FIG. 16F.
Figure 18B:
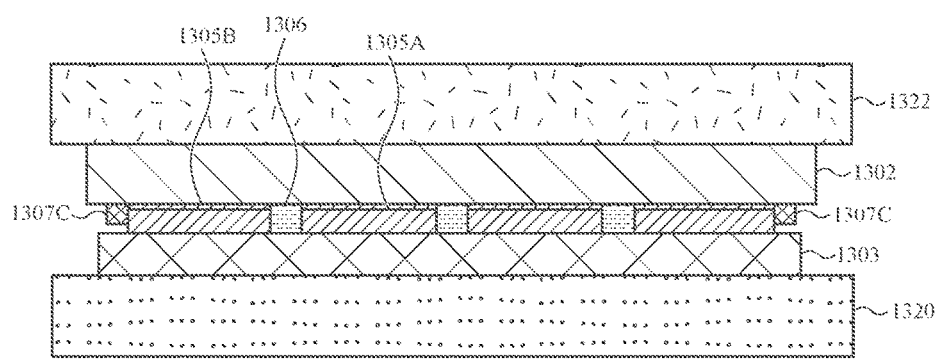
FIG. 18B depicts an alternative implementation of the touch device stack shown in FIG. 16G.

In this example, the PSA adhesive dam 1307C contacts and/or adheres to both the cover layer component 1302 and the touch-sensing layer component 1303 during assembly. However, in other implementations, such as shown in FIGS. 18A and 18B, the PSA adhesive dam 1307C may contact an inner portion of the first PSA wings 1307A without departing from the scope of the present disclosure. As such, a gap may be formed between the PSA adhesive dam 1307C and the touch-sensing layer component 1303 when the first and second PSA wings 1307A, 1307B are removed.

Although the above illustrates and describes forming the bonding component using liquid adhesive that cures at room temperature, it is understood that this is an example. In various implementations, other adhesives may be used without departing from the scope of the present disclosure. For example, a thermal bonding film, multiple-part and/or other liquid adhesives, hot melt adhesive, film adhesive, and so on may be used.

Further, although the above illustrates and describes the touch device stack as flat, it is understood that this is an example. In various implementations, the touch device stack or other laminated component may be formed in other shapes. Room temperature activation and cure may be specifically suited to forming non-flat shapes. For example, although the clamp mechanism 1314 is illustrated with flat surface profiles, use of clamping fixtures with other surface profiles during activation and/or curing may allow formation of non-flat stack shapes. Further, a touch device stack with a concave shape along one or more edges may be achieved by placing shims on a curing fixture at appropriate locations during curing to create uneven support and induce bending. This bent shape may set in permanently as the liquid adhesive cures and cements the structure. Such shaping may allow the touch device stack to be shape-matched with a shape of a matching surface of a case or other housing, such as a consistently bowed shape that may be an artifact of manufacturing the case or other housing.

Additionally, although the above illustrates and describes the PSA adhesive dam 1307C as becoming a permanent component of the touch device stack, it is understood that this is an example. In other implementations, the PSA adhesive dam 1307C may be retractable and/or removable. In various implementations, a retractable or removable dam made of a non-wetting material (such as polytetrafluoroethylene or the like) may be used instead of the PSA adhesive dam 1307C.

Moreover, in various implementations, a dam may be formed by stencil printing and/or otherwise dispensing adhesive along a perimeter rather than using the PSA adhesive dam 1307C. The height of such a dam may be set to create a small clearance with the mating surface of the opposing component. This may result in a crawl space that is sufficient for gas to escape but adhesive may be retained by capillary forces.

Additionally, in some implementations, a liquid adhesive border may be formed by UV or otherwise curing the edges of the room-temperature-activated liquid adhesives 1305A, 1305B, such as from the sides. This may prevent the room-temperature-activated liquid adhesives 1305A, 1305B from flowing past the outer edges. In such an implementation, the PSA adhesive dam 1307C may be omitted.

Further, although not specifically discussed above, in some implementations, the room-temperature-activated liquid adhesives 1305A, 1305B may be cured at different rates. This may depend on the amount of incident activation energy, thickness of the room-temperature-activated liquid adhesives 1305A, 1305B, exposure time, and so on. Such different rate curing may be used to selectively speed up cure at specific locations to create fixture strength, while allowing other locations to cure at a slower rate. This may prevent excess heat buildup due to exothermic cure processes, which in turn could adversely affect flatness, gas migration to exits, the amount of the time window between when the room-temperature-activated liquid adhesives 1305A, 1305B is activated and parts to be bonded can be brought together, and the ability to influence touch device stack shape.

Additionally, in some implementations, the wings or other structures formed by the first PSA wings 1307A and the second PSA wings 1307B may extend the entire periphery of the touch device stack. In such an example, the PSA adhesive dam 1307C may be omitted.

Moreover, in various implementations, the wings or other structures formed by the first PSA wings 1307A and the second PSA wings 1307B may be used as a process control tool. The flow of the room-temperature-activated liquid adhesives 1305A, 1305B and/or distribution along the apertures in the PSA adhesive dam 1307C may be compared to determine the quality of the room-temperature-activated liquid adhesives 1305A, 1305B dispensation as well as overall lamination quality. For example, a room-temperature-activated liquid adhesives 1305A, 1305B dispensation of uniform thickness and lamination with perfectly parallel touch-sensing layer component 1303 and cover layer components 1302, room-temperature-activated liquid adhesives 1305A, 1305B forced out into the wings along all edges would be symmetric and within pre-determined limits. Feedback obtained by examining the wings may be used to tune room-temperature-activated liquid adhesives 1305A, 1305B dispensation, lamination surfaces, and/or other parameters.

Additionally, although the above illustrates and describes the first and second PSA wings 1307A, 1307B as PSA, it is understood that these are examples. In various implementations, the first and second PSA wings 1307A, 1307B may be formed of any kind of thin film or other material and bonded using a low adhesion bond adhesive rather than PSA without departing from the scope of the present disclosure.

Figure 17A:
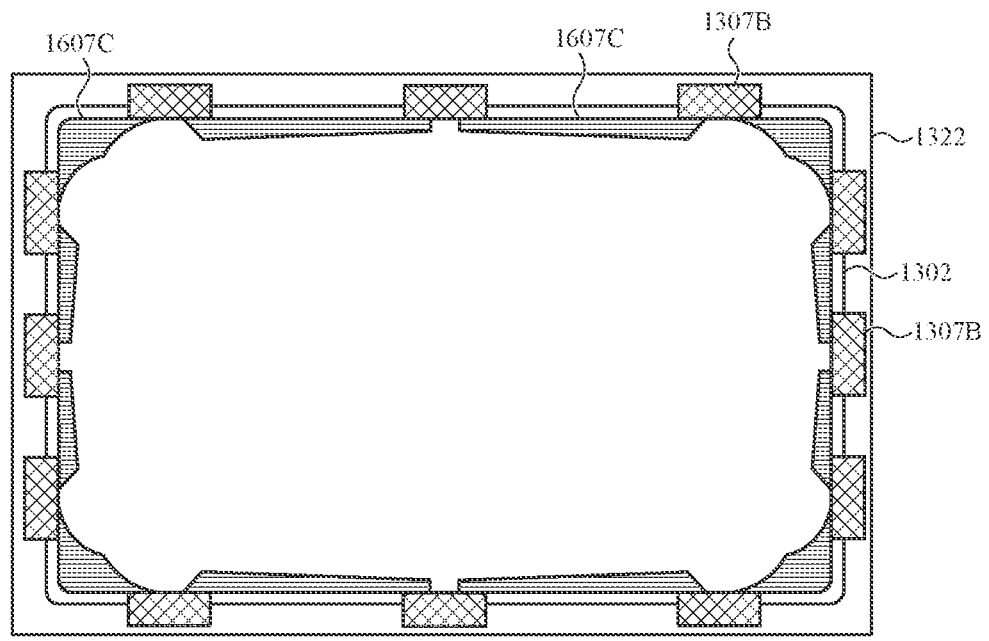
FIG. 17A depicts an alternative to the example shown in FIG. 15B where an alternative example of a PSA adhesive dam is used rather than the PSA adhesive dam of FIG. 15B.

Further, although the above illustrates and describes the PSA adhesive dam 1307C as having a particular configuration, it is understood that this is an example. FIG. 17A depicts an alternative to the example shown in FIG. 15B where a PSA adhesive dam 1607C is used rather than the PSA adhesive dam 1307C of FIG. 15B. As illustrated, the PSA adhesive dam 1607C is configured with a different shape than the PSA adhesive dam 1307C.

Figure 17B:
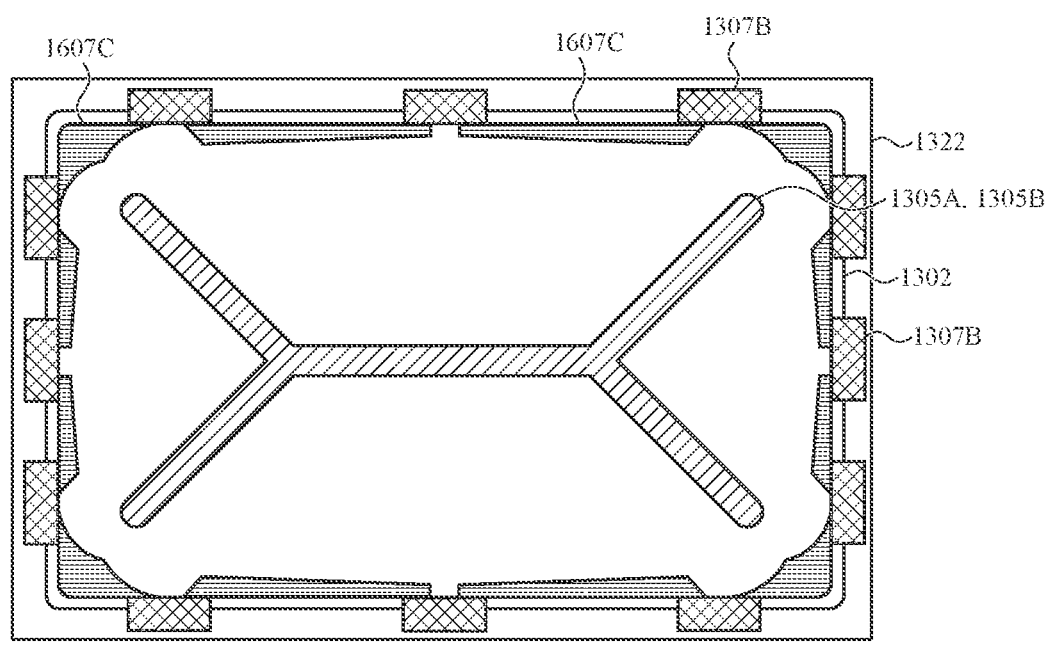
FIG. 17B depicts the cover layer component of FIG. 17A as the assembly including the touch-sensing layer component and the assembly including the cover layer component are brought together, with the assembly including the touch-sensing layer component removed for clarity.

FIG. 17B depicts the cover layer component 1302 of FIG. 17A as the assembly including the touch-sensing layer component 1303 and the assembly including the cover layer component 1302 are brought together, with the assembly including the touch-sensing layer component 1303 removed for clarity. As illustrated, the assembly including the touch-sensing layer component 1303 and the assembly including the cover layer component 1302 have been brought together sufficiently for the room-temperature-activated liquid adhesive 1305A, 1305B to contact the cover layer component 1302 via the center of the dog bone shaped configuration prior to the room-temperature-activated liquid adhesive 1305A, 1305B wetting progressively radially outward to expel air.

Figure 17C:
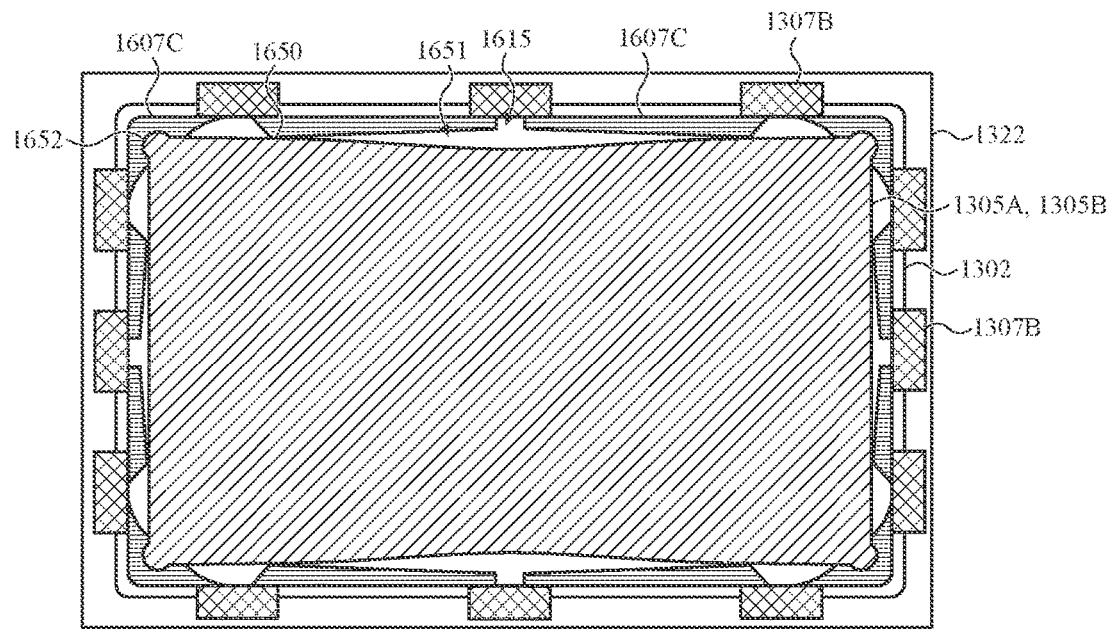
FIG. 17C depicts the assembly of FIG. 17B as the touch-sensing layer component and the assembly including the cover layer component continue moving together.
Figure 17D:
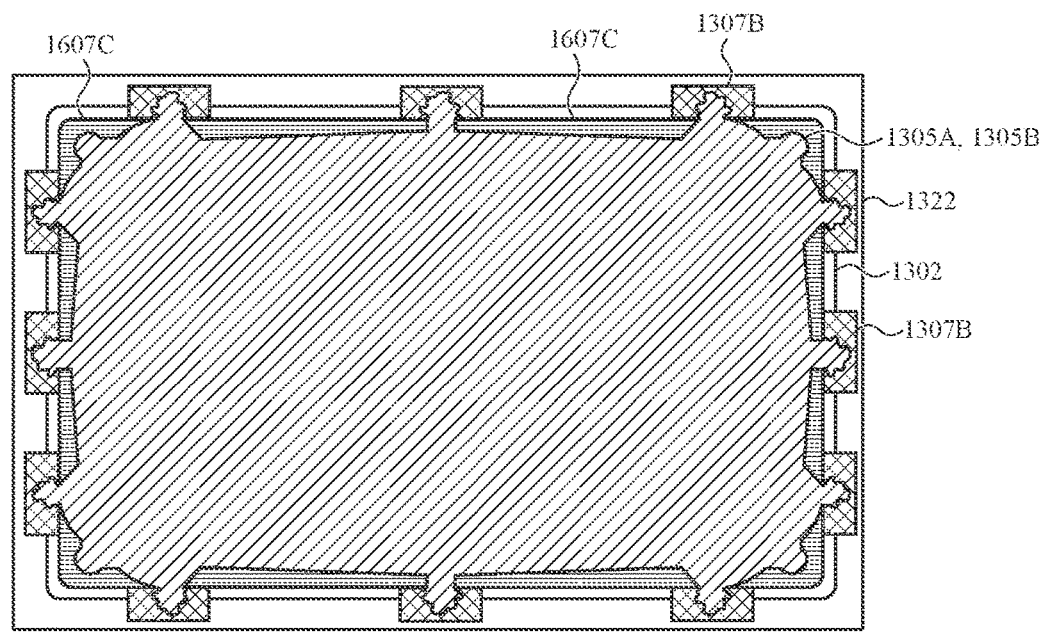
FIG. 17D depicts the assembly of FIG. 17C as the touch-sensing layer component and the assembly including the cover layer component finish moving together.

FIG. 17C depicts the assembly of FIG. 17B as the touch-sensing layer component 1303 and the assembly including the cover layer component 1302 continue moving together such that the room-temperature-activated liquid adhesive 1305A, 1305B wets progressively radially outward to expel air. As described above, the dimensions of the PSA adhesive dam 1607C are angled to be constantly diverging. The PSA adhesive dam 1307C is angled from tangency points 1650 toward openings 1615 such that the room-temperature-activated liquid adhesive 1305A contacts the tangency points 1650 first, leaving diverging gaps 1651 between the rest of the room-temperature-activated liquid adhesive 1305A and the portions of the PSA adhesive dam 1307C closer to the openings 1615. As the touch-sensing layer component 1303 and the cover layer component 1302 are brought even closer together, the room-temperature-activated liquid adhesives 1305A flow, closing the diverging gaps 1651, until a portion is forced through the openings and into the gaps between the first and second PSA wings 1307A, 1307B, as illustrated in FIG. 17D.

In this example, the room-temperature-activated liquid adhesive 1305A and the PSA adhesive dam 1607C are configured such that there is a partial overlap area 1652 between the room-temperature-activated liquid adhesive 1305A and the PSA adhesive dam 1607C when the touch-sensing layer component 1303 and the assembly including the cover layer component 1302 come together. This "corner wetting" may further prevent formation of bubbles, voids, or gaps in the room-temperature-activated liquid adhesive 1305A at corners.

Returning to FIG. 3, although the cover layer component 202, the touch-sensing layer component 203, and the stiffener layer component 204 are illustrated as components including a single layer, it is understood that this is an example. In various implementations, one or more of the cover layer component 202, the touch-sensing layer component 203, and/or the stiffener layer component 204 may include multiple layers without departing from the scope of the present disclosure.

For example, in some implementations, the touch-sensing layer component 203 may include one or more glass, plastic, or other substrates and one or more electrodes, traces, or other configurations of conductive material. For example, in various embodiments, a touch-sensing layer component 203 may include glass substrate having indium tin oxide electrodes formed on a top surface. By way of another example, in various embodiments, a touch-sensing layer component 203 may include a polyethylene terephthalate substrate with conductive material traces running in a first direction on a top surface and conductive material traces running in a second direction on a top surface. By way of yet another example, a touch-sensing layer component 203 may include conductive material positioned between two substrates.

Although the techniques discussed herein are described in the context of stiffening a trackpad 101, it is understood that this is an example. In various implementations, techniques discussed herein may be used to form trackpads or other stacks, devices, or laminates that include regions of different stiffness and/or flexibility. For example, the techniques discussed herein may be used to form a trackpad or other stack, device, or laminate that includes one or more localized flexing regions and/or one or more stiff regions. Various configurations are possible and contemplated.

Although the electronic device 100 of FIG. 2A is illustrated and described as a laptop computing device, it is understood that this is an example. In various implementations, the electronic device 100 may be any kind of electronic device 100 without departing from the scope of the present disclosure. For example, the electronic device 100 may be a mobile computing device, a desktop computing device, a smart phone, a wearable device, a display, a cellular telephone, a tablet computing device, a printer, a computer mouse, a speaker, a router, a digital media player, and so on.

Further, although the trackpad 101 of FIG. 2A is illustrated and described as a trackpad 101 incorporated into a laptop computing device, it is understood that this is an example. In various implementations, the techniques described herein may be used in laminating and/or otherwise assembling any kind of touch device, transparent touch screen, touch device stack, touch device stack component, and/or other stack or stack component. For example, in some implementations, the techniques illustrated and described herein may be used in laminating and/or otherwise assembling a display and/or other device. By way of another example, in various implementations, techniques illustrated and described herein may be used in laminating and/or otherwise assembling an external trackpad.

For example, components in a display stack may utilize an adhesive system including a bonding component, an adhesive-spacing component, and/or an adhesive-alignmentholding component according to the techniques of the present disclosure. In such an example, optical signals may be transmitted through the adhesive system. As such, the bonding component, the adhesive-spacing component, and/or the adhesive-alignment-holding component may be optically matched so that the optical signals do not change direction or do not significantly change direction when traveling between the bonding component, the adhesive-spacing component, and/or the adhesive-alignment-holding component.

Although the present disclosure is discussed in the context of a stack component such as the trackpad 101, it is understood that this is an example. In various embodiments, the techniques discussed herein may be used in a variety of different laminates, components, and so on. For example, the techniques discussed herein may be used to form, laminate, stiffen, strengthen, and so on one or more portions of an electronic device housing and/or components thereof.

As described above and illustrated in the accompanying figures, the present disclosure relates to a stack of layer components laminated together, such as the stack of a trackpad. The component stack includes at least a first layer component coupled to a second layer component by an adhesive system. The adhesive system includes a bonding component, an adhesive-spacing component, and an adhesive-alignment-holding component. The bonding component bonds the layer components. The adhesive-spacing component maintains spacing between the layer components during curing of the bonding component. The adhesive-alignment-holding component maintains alignment of the layer components during curing of the bonding component and defines an area around the adhesive-spacing component that is filled with the bonding component.

In the present disclosure, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A computing structure for an electronic device, comprising:
   a cover;
   a touch-sensing component positioned below the cover; and
   an adhesive layer coupling the cover to the touch-sensing component, comprising:
      an alignment-holding component defining a perimeter;
      a spacing component positioned within the perimeter and formed from a cured liquid adhesive material; and
      a bonding component filling a space within the perimeter around the spacing component, the bonding component bonding the cover to the touch-sensing component; wherein
   the bonding component is formed from the liquid adhesive material; and
   the cured liquid adhesive material has a higher stiffness than the alignment-holding component.

2. The computing structure of claim 1, further comprising:
   an additional adhesive layer bonded to the touch-sensing component; and
   a stiffener coupled to the touch-sensing component by the additional adhesive layer.

3. The computing structure of claim 2, wherein the cover and the stiffener are coupled to opposing surfaces of the touch-sensing component.

4. The computing structure of claim 1, wherein the cured liquid adhesive and the spacing component are optically matched.

5. The computing structure of claim 1, wherein the spacing component is one of an array of spacing components.

6. The computing structure of claim 5, wherein the bonding component surrounds the array of spacing components.

7. The computing structure of claim 1, wherein the spacing component and bonding component have equal thicknesses.

8. The computing structure of claim 1, wherein the cover and the touch- sensing component are parallel to each other.

9. The computing structure of claim 1, wherein the alignment-holding component is dielectrically matched to the liquid adhesive material.

* * * * *